United States Patent
Kurishita et al.

(10) Patent No.: US 10,618,014 B2
(45) Date of Patent: Apr. 14, 2020

(54) GAS SEPARATION MEMEBRANE

(71) Applicant: Asahi Kasei Kabushiki Kaisha, Tokyo (JP)

(72) Inventors: Yasutaka Kurishita, Tokyo (JP); Masato Mikawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 221 days.

(21) Appl. No.: 15/577,564

(22) PCT Filed: May 24, 2016

(86) PCT No.: PCT/JP2016/065351
§ 371 (c)(1),
(2) Date: Nov. 28, 2017

(87) PCT Pub. No.: WO2016/194711
PCT Pub. Date: Dec. 8, 2016

(65) Prior Publication Data
US 2018/0169594 A1  Jun. 21, 2018

(30) Foreign Application Priority Data

May 29, 2015 (JP) ................... 2015-110200
Jun. 23, 2015 (JP) ................... 2015-125576
Nov. 16, 2015 (JP) ................... 2015-223866

(51) Int. Cl.
*B01D 53/22* (2006.01)
*B01D 71/08* (2006.01)
(Continued)

(52) U.S. Cl.
CPC .......... *B01D 71/08* (2013.01); *B01D 53/228* (2013.01); *B01D 67/0002* (2013.01);
(Continued)

(58) Field of Classification Search
CPC .... B01D 69/02; B01D 2325/04; B01D 71/82; B01D 2325/34; B01D 67/0002;
(Continued)

(56) References Cited

U.S. PATENT DOCUMENTS 5,817,165 A    10/1998  Hachisuka et al.
6,780,327 B1 *  8/2004  Wu ................... B01D 15/363
                                                210/488

(Continued)

FOREIGN PATENT DOCUMENTS

JP    S61-046207 A    3/1986
JP    S61-093802 A    5/1986
(Continued)

OTHER PUBLICATIONS

International Preliminary Report on Patentability and Written Opinion issued in corresponding International Patent Application No. PCT/JP2016/065351 dated Dec. 14, 2017.
(Continued)

*Primary Examiner* — Anthony R Shumate
(74) *Attorney, Agent, or Firm* — Morgan, Lewis & Bockius LLP

(57) ABSTRACT

A gas separation membrane, characterized by having a porous support and a polyamine layer formed on the porous support, the number-average molecular weight of the polyamine constituting a part of the polyamine being 100,000-500,000.

18 Claims, 3 Drawing Sheets

(51) Int. Cl.
 *B01D 69/02* (2006.01)
 *B01D 69/10* (2006.01)
 *B01D 71/82* (2006.01)
 *B01D 69/08* (2006.01)
 *B01D 71/60* (2006.01)
 *B01D 67/00* (2006.01)

(52) U.S. Cl.
 CPC ............ *B01D 69/02* (2013.01); *B01D 69/08* (2013.01); *B01D 69/10* (2013.01); *B01D 71/60* (2013.01); *B01D 71/82* (2013.01); *B01D 2323/30* (2013.01); *B01D 2323/46* (2013.01); *B01D 2325/04* (2013.01); *B01D 2325/34* (2013.01)

(58) Field of Classification Search
 CPC ............... B01D 71/08; B01D 2323/46; B01D 2323/30; B01D 53/228; B01D 69/10; B01D 71/60; B01D 69/08
 See application file for complete search history.

(56) References Cited

U.S. PATENT DOCUMENTS

| | | | |
|---|---|---|---|
| 2004/0215045 A1 | 10/2004 | Herrera et al. | |
| 2005/0103705 A1* | 5/2005 | Kurth | B01D 67/0088 210/500.21 |
| 2008/0296225 A1* | 12/2008 | Ho | B01D 67/0006 210/640 |
| 2009/0078640 A1* | 3/2009 | Chu | B01D 67/0013 210/321.6 |
| 2009/0301307 A1 | 12/2009 | Sugiyama et al. | |
| 2011/0005997 A1* | 1/2011 | Kurth | B01D 65/08 210/500.27 |
| 2012/0285890 A1* | 11/2012 | Koehler | B01D 67/0079 210/651 |
| 2014/0130669 A1 | 5/2014 | Sano et al. | |
| 2014/0345462 A1 | 11/2014 | Itou | |
| 2016/0051938 A1 | 2/2016 | Okada et al. | |
| 2016/0207007 A1* | 7/2016 | Zhang | B01D 71/08 |
| 2017/0014779 A1* | 1/2017 | Jeon | B01D 69/125 |
| 2017/0056837 A1* | 3/2017 | Goenaga | B01D 69/125 |
| 2017/0056840 A1* | 3/2017 | Koehler | B01D 69/125 |
| 2018/0169594 A1* | 6/2018 | Kurishita | B01D 53/228 |
| 2018/0345230 A1* | 12/2018 | Karns | B01D 71/68 |
| 2019/0060844 A1* | 2/2019 | Liu | B01D 71/68 |

FOREIGN PATENT DOCUMENTS

| | | |
|---|---|---|
| JP | H03-109930 A | 5/1991 |
| JP | H09-00898 A | 1/1997 |
| JP | 2011-161387 A | 8/2011 |
| JP | 5019502 B2 | 9/2012 |
| JP | 2013-046903 A | 3/2013 |
| JP | 2013-166131 A | 8/2013 |
| JP | 5507079 B | 5/2014 |
| WO | 2014/157069 A1 | 10/2014 |

OTHER PUBLICATIONS

International Search Report issued in corresponding International Patent Application No. PCT/JP2016/065351 dated Aug. 16, 2016.
Ka and pKa for Polyprotic Acids (http://web.archibe.org/web/20041218034839/http://www2.ucdsb.on.ca/tiss/stretton/database/polyprotic_acids.htm) (2004).

* cited by examiner

GAS SEPARATION MEMEBRANE

TECHNICAL FIELD

The present invention relates to a gas separation membrane that demonstrates superior separation performance with respect to olefins.

BACKGROUND ART

The separation and concentration of gases using a gas separation membrane is a method that demonstrates superior energy efficiency, energy conservation and safety in the case of comparing with other methods such as distillation or high-pressure adsorption. Pioneering examples of the practical use thereof include separation and concentration of gas using a gas separation membrane and hydrogen separation in the ammonia production process. More recently, extensive studies are being conducted on a method for recovering carbon dioxide, which is a greenhouse gas, from synthesis gas or natural gas using a gas separation membrane (see, for example, Patent Documents 1, 2, and 3).

The typical form of a gas separation membrane consists of a separation layer formed on the surface of a porous support. This form is effective for providing high gas permeation volume while imparting a certain degree of strength to the membrane. The separation layer in this case refers to a layer composed only of a gas-separating polymer.

In general, the performance of a gas separation membrane is expressed using permeation rate and separation factors as indices. Permeation rate is expressed by the formula indicated below.

(Permeability coefficient of gas-separating polymer)/
(thickness of separation layer)

As is clear from the aforementioned formula, it is necessary to reduce the thickness of the separation layer as much as possible in order to obtain a membrane having a high permeation rate. Separation factor is expressed as the ratio of the permeation rates of the two types of gases to be separated, and is dependent on the material of the gas-separating polymer.

On the basis of the above, it is necessary to reduce the thickness of the separation layer as much as possible without creating any defects in order to obtain practical performance as a gas separation membrane, and extensive studies have been conducted thereon (see, for example, Patent Documents 4 and 5). As is also clear from the aforementioned formula, permeation rate increases the higher the permeability coefficient of the gas. Namely, it is important to make a material having a large permeability coefficient and separation factor as thin as possible. This is because a gas separation membrane ideally becomes better the higher the permeability coefficient and separation factor, thereby resulting in an efficient membrane process. Separation factor is expressed as the ratio of the permeation rates of the two types of gases to be separated, and is dependent on the material of the gas-separating polymer.

PRIOR ART DOCUMENTS

Patent Documents

Patent Document 1: International Publication No. WO 2014/157069
Patent Document 2: Japanese Unexamined Patent Publication No. 2011-161387
Patent Document 3: Japanese Unexamined Patent Publication No. H9-898
Patent Document 4: Japanese Patent No. 5507079
Patent Document 5: Japanese Patent No. 5019502

DISCLOSURE OF THE INVENTION

Problems to be Solved by the Invention

In the prior art, however it was difficult to form a separation layer having as little thickness as possible on the surface of a porous support without causing defects. The reason for this is thought to be that, when forming the separation layer on the surface of the porous support, the gas-separating polymer serving as the material of the separation layer penetrates inside the support.

Thus, a gas separation membrane according to the prior art is unable to obtain the expected level of gas separation performance, and for example, is inadequate in terms of separation factor and permeation rate.

Thus, an object of the present invention is to provide a gas separation membrane that has a large separation factor, large gas permeability coefficient and demonstrates a high permeation rate without causing defects.

Means for Solving the Problems

The inventors of the present invention conducted extensive studies to solve the aforementioned problems. As a result thereof, the inventors of the present invention found that, in a gas separation membrane having a separation layer composed of a polyamine as a gas-separating polymer on a porous support, the aforementioned object can be achieved by implementing at least one of the following measures:

(1) allowing a portion of the gas-separating polymer to suitably impregnate the porous support when forming the separation layer on the porous support, (2) lowering the molecular weight of the gas-separating polymer used for the separation layer, and (3) chemically modifying a side chain of the gas-separating polymer.

Namely, the present invention is summarized as indicated below.

[1] A gas separation membrane,
having a porous support and a polyamine layer formed on the porous support; wherein,
the number-average molecular weight of the polyamine composing the polyamine layer is 100,000 to 500,000.

[2] The gas separation membrane described in [1], wherein the number-average molecular weight of the polyamine is 100,000 to 200,000.

[3] The gas separation membrane described in [1] or [2], wherein the polyamine is a gelatinous polymer.

[4] The gas separation membrane described in [3], wherein the polyamine is chitosan.

[5] A gas separation membrane,
having a porous support and a polyamine layer formed on the porous support; wherein,
the polyamine layer is composed of a polyamine,
an impregnation layer obtained by impregnating a polyamine is formed on the side of the polyamine layer of the porous support,
the thickness of the impregnation layer is 20 μm or less, and
the ratio of the thickness of the impregnation layer to the thickness of the polyamine layer is 5 or less.

[6] The gas separation membrane described in [5], wherein the thickness of the impregnation layer is 5 μm or less, and
the ratio of the thickness of the impregnation layer to the thickness of the polyamine layer is 3 or less.

[7] The gas separation membrane described in [5] or [6], wherein the polyamine is a gelatinous polymer.

[8] The gas separation membrane described in [7], wherein the polyamine is chitosan.

[9] A gas separation membrane,
having a porous support and a polyamine layer arranged on the porous support; wherein,
the polyamine layer has a crosslinked structure.

[10] The gas separation membrane described in [9], wherein the crosslinked structure contains one or more types of structures selected from the group consisting of a structure having an amide group, a structure having an imide group, a structure having an imino group, a structure having a urea group, a structure having a pyridinium group, a structure having a carbonate group, a structure having a urethane group, a structure having a sulfonyl group, and a structure having an ester group.

[11] The gas separation membrane described in [10], wherein functional group ratio A/B, defined as the ratio of total absorbance A attributable to functional groups contained in the crosslinked structure to absorbance B attributable to amino groups, during infrared spectroscopic analysis is 0.1 to 7.5.

[12] The gas separation membrane described in [11], wherein the functional group ratio A/B is 0.9 to 5.0.

[13] The gas separation membrane described in any of [9] to [12], wherein the polyamine is a gelatinous polymer.

[14] The gas separation membrane described in [13], wherein the polyamine is chitosan.

[15] The gas separation membrane described in any of [5] to [8], wherein the number-average molecular weight of the polyamine is 100,000 to 500,000.

[16] The gas separation membrane described in [15], wherein the number-average molecular weight of the polyamine is 100,000 to 200,000.

[17] The gas separation membrane described in any of [9] to [14], wherein
an impregnation layer obtained by impregnating polyamine is formed on the side of the polyamine layer of the porous support,
the thickness of the impregnation layer is 20 μm or less, and
the ratio of the thickness of the impregnation layer to the thickness of the polyamine layer is 5 or less.

[18] The gas separation membrane described in [17], wherein
the thickness of the impregnation layer is 5 μm or less, and
the ratio of the thickness of the impregnation layer to the thickness of the polyamine layer is 3 or less.

[19] A gas separation membrane,
having a porous support and a polyamine layer formed on the porous support; wherein
the polyamine that composes the polyamine layer is chemically modified with a functional group, and
the modification rate of the polyamine by a functional group is 1% to 80%.

[20] The gas separation membrane described in [19], wherein the modification rate of the polyamine by a functional group is 1% to 50%.

[21] The gas separation membrane described in [20], wherein the modification rate of the polyamine by a functional group is 1% to 31%.

[22] The gas separation membrane described in any of [19] to [21], wherein the functional group has a protonic acid group having a pKa value of 5 or more.

[23] The gas separation membrane described in any of [19] to [22], wherein the polyamine is a gelatinous polymer.

[24] The gas separation membrane described in [23], wherein the polyamine is chitosan.

[25] The gas separation membrane described in any of [19] to [24], wherein the functional group is at least one group selected from the group consisting of an imidazole group, isobutyl group and glyceryl group.

[26] The gas separation membrane described in any of [1] to [18], wherein the polyamine that composes the polyamine layer is chemically modified with a functional group, and the modification rate of the polyamine by a functional group is 1% to 80%.

[27] The gas separation membrane described in [26], wherein the modification rate of the polyamine by a functional group is 1% to 50%.

[28] The gas separation membrane described in [27], wherein the modification rate of the polyamine by a functional group is 1% to 31%.

[29] The gas separation membrane described in any of [1] to [18] and any of [26] to [28], wherein the polyamine has a protonic acid group having a pKa value of 5 or more.

[30] The gas separation membrane described in any of [1] to [29], wherein the polyamine that composes the polyamine layer forms a metal salt containing one or more types of metal atoms selected from the group consisting of Ag and Cu.

[31] The gas separation membrane described in any of [1] to [30], wherein, when using a mixed gas composed of 40% by weight of propane and 60% by weight of propylene, setting the supply side gas flow rate to 190 cc/min, setting the permeation side gas flow rate to 50 cc/min and measuring in a humidified atmosphere under isobaric conditions at 30° C., the permeation rate of propylene gas is 15 GPU to 1,500 GPU and the separation factor α of propylene/propane is 50 to 1,000.

[32] A method for producing the gas separation membrane described in any of [1] to [31], comprising at least the following steps:
a porous support production step for producing a porous support,
a coating solution production step for producing a coating solution composed of an aqueous solution containing a polyamine, and
a coating step for coating the coating solution on the surface of the porous support.

[33] The method for producing a gas separation membrane described in [32], having an impregnation step for impregnating the porous support with a viscous aqueous solution prior to the coating step.

[34] The method for producing a gas separation membrane described in [33], wherein the viscous aqueous solution is an aqueous solution containing one or more types of solutes selected from glycerin, ethylene glycol and propylene glycol.

[35] The method for producing a gas separation membrane described in [33] or [34], comprising a contact step for contacting the porous support with an aqueous solution containing a crosslinking agent before or after the coating step.

[36] The method for producing a gas separation membrane described in any of [32] to [35], wherein the polyamine is a chemically modified polyamine.

Effects of the Invention

According to the present invention, a gas separation membrane can be provided that demonstrates a high permeation rate and high separation performance with respect to olefins.

BEST MODE FOR CARRYING OUT THE INVENTION

Figure 1:
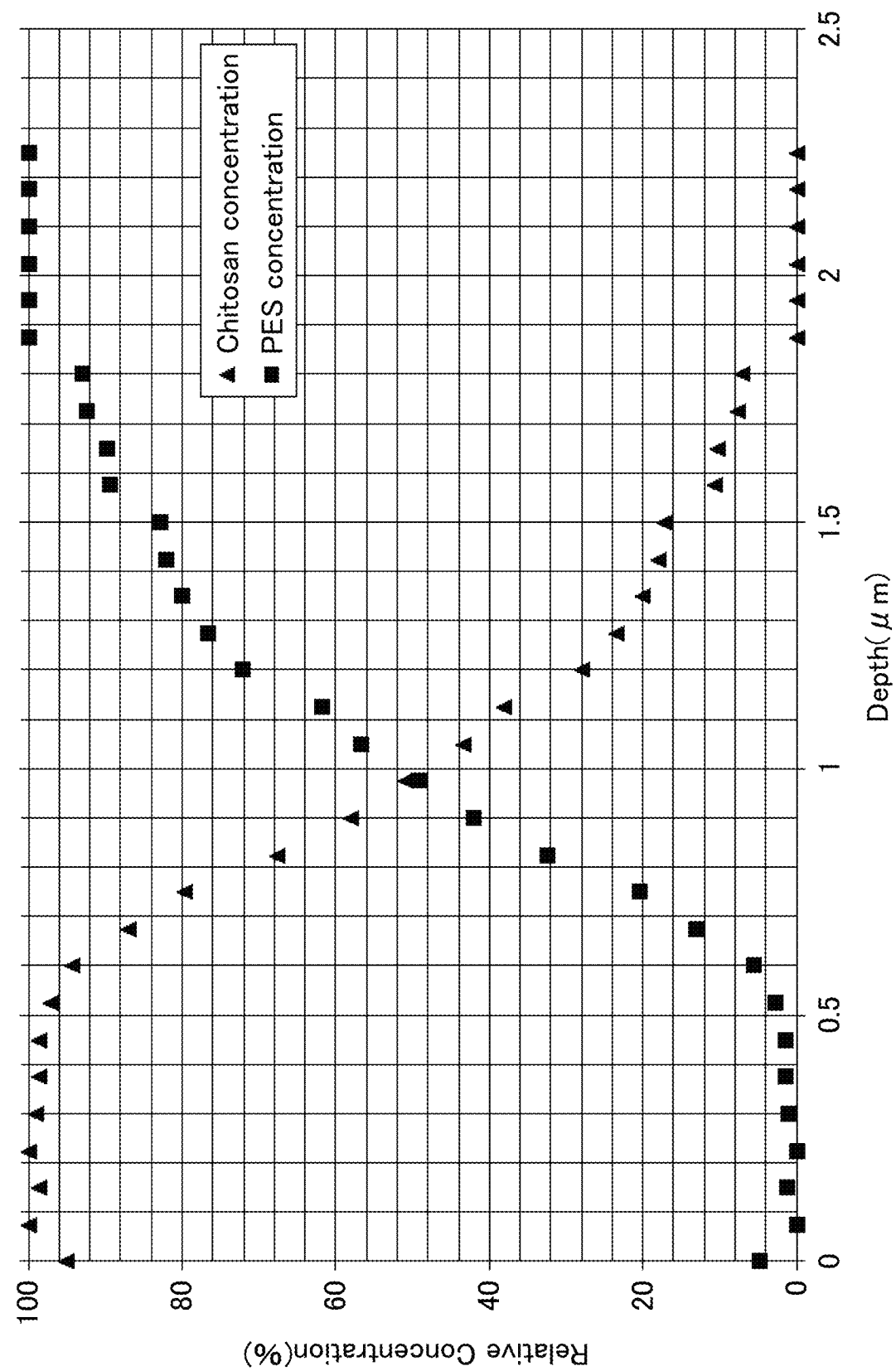
FIG. 1 is a graph indicating relative element concentrations for a hollow fiber gas separation membrane obtained in Example 3-3.

The following provides a detailed explanation of the present invention focusing primarily on a preferred embodiment thereof (to be referred to as the "present embodiment").

The gas separation membrane in the present embodiment has a porous support and a polyamine layer arranged on the porous support.

[Porous Support]

The porous support in the gas separation membrane of the present embodiment is a porous support composed of a membrane having a large number of fine pores that connect the front and back of the membrane by passing there through. Although this porous support does not substantially have gas separation performance, it is able to impart mechanical strength to the gas separation membrane of the present embodiment. The form thereof can be that of, for example, hollow fibers or a flat film.

There are no particular limitations on the material of the porous support. A material such as polystyrene, polyether sulfone, PVDF or PTFE is preferable from the viewpoints of chemical resistance and solvent resistance, or a material such as homopolymer or copolymer of polyimide, polybenzoxazole or polybenzimidazole is preferable from the viewpoint of heat resistance, and may be formed from any of these materials alone or a mixture thereof.

The mean pore diameter of the outer surface of the porous support is preferably 1 nm to 1,000 nm from the viewpoints of easily securing both permeability and mechanical strength and adjusting the separation factor to within a suitable range.

The film thickness of the porous support is preferably 5 μm to 500 μm from the viewpoint of achieving a favorable balance between mechanical strength and permeability.

In the case the porous support is in the form of hollow fibers, the outer diameter thereof is preferably 0.3 mm to 3 mm and more preferably 0.5 mm to 1.5 mm. This is because, if the outer diameter of the hollow fiber membrane is excessively small, problems occur such as difficulty in handling the hollow fibers when fabricating a hollow fiber membrane module, while conversely, if the outer diameter of the hollow fiber membrane is excessively large, the number of hollow fiber membranes able to be inserted into a cylindrical container of the same size decreases, thereby resulting in problems such as a decrease in filtration area.

The inner diameter of a hollow fiber porous support is preferably 0.05 mm to 1 mm. This is because, if the inner diameter of the hollow fibers is excessively small, problems occur such as increases in pressure loss and raw material cost, while conversely, if the inner diameter of the hollow fiber membrane is excessively large, problems occur such as breakage of the membrane when pressure is applied during operation.

The mean pore diameter, film thickness, and outer and inner diameters of the hollow fibers can each be adjusted to desired ranges by controlling production conditions of the porous support.

Only one hollow fiber porous support may be used or a plurality thereof may be used collectively. In the case of using a plurality of hollow fiber porous supports collectively, the number of supports used is preferably 10 to 100,000 and more preferably 10,000 to 50,000.

[Polyamine Layer]

The polyamine layer has the function of imparting practical gas separation performance to the gas separation membrane of the present embodiment.

The polyamine layer is formed from a constituent material at least containing polyamine. A gas separation membrane having a polyamine layer formed from a constituent material at least containing polyamine as the separation layer is able to disperse a metal salt optionally contained in the separation layer at a high concentration. This is advantageous since it allows the obtaining of a gas separation membrane that is preferable for separating, for example, olefins and paraffin.

The polyamine used here is preferably a gelatinous polymer. A gelatinous polymer refers to a polymer that is swollen by water. The use of a gelatinous polymer for the polyamine makes it possible to uniformly disperse a metal salt optionally contained in the separation layer at a high concentration.

Examples of polyamines preferably used in the present embodiment include polyallylamine derivatives, polyethyleneimine derivatives and polyamidoamine dedrimer derivatives.

The polyamine is preferably a crystalline polymer. As a result, durability of the polyamine layer is improved in the resulting gas separation membrane.

The polyamine is more preferably a gelatinous polymer and a crystalline polymer. A polyamine layer formed from a polyamine that is a gelatinous polymer and crystalline polymer makes it possible to uniformly disperse a metal salt optionally contained in the separation layer at a high concentration while also having high durability.

Chitosan is an example of a polyamine preferably used in the present embodiment. Chitosan refers to a linear polysaccharide that at least contains β-1,4-N-glucosamine as a repeating unit and in which the percentage of the β-1,4-N-glucosamine in the repeating unit is 70 mol % or more. The chitosan may also contain β-1,4-N-acetylglucosamine as a repeating unit. The upper limit of the percentage of β-1,4-N-acetylglucosamine in the repeating units of chitosan is preferably 30 mol % or less.

The polyamine may be chemically modified by a functional group. This functional group is preferably at least one type of group selected from the group consisting of an imidazole group, isobutyl group and glyceryl group.

The aforementioned functional group is preferably a group having a protonic acid group having a pKa value of 5 or more. The pKa of the protonic acid is preferably 10 or more, more preferably 30 or more and particularly preferably 60 or more.

A functional group having a protonic acid group having a pKa value of less than 5 strongly and excessively interacts with metal ions optionally contained in the polyamine layer. Consequently, it becomes difficult to apply the resulting gas separation membrane to separation of olefins and paraffin, for example. Thus, the pKa of the most highly acidic protonic acid group among protonic acid groups contained in the aforementioned functional group is preferably 5 or more and more preferably 10 or more, 30 or more, or 60 or more.

More specifically, the aforementioned functional group preferably uses, for example, one or more types of groups selected from the group consisting of:

alkyl groups such as a methyl group, ethyl group, propyl group, isopropyl group, butyl group, isobutyl group, s-butyl group, t-butyl group, pentyl group, cyclopentyl group, isopentyl group, hexyl group, cyclohexyl group, heptyl group, octyl group, nonyl group or decyl group, and derivatives thereof;

alkenyl groups such as an allyl group or vinyl group, and derivatives thereof;

aromatic groups such as a phenyl group, phenol group, pyridyl group, imidazole group, benzyl group, benzal group, quinolyl group, naphthyl group, indole group, phenol group, thiophene group, oxazole group or benzoyl group, and derivatives thereof;

carbonyl groups such as an acetyl group, aldehyde group, ester group, imide group or amide group, and derivatives thereof;

cationic groups such as an ammonium group or quanidino group, and derivatives thereof;

alkoxy groups such as a methoxy group or ethoxy group, and derivatives thereof;

hydroxyl groups such as a glyceryl group, and derivatives thereof;

sulfur-containing groups such as a sulfonamide group, sulfonate group, sulfonoxide group, thiol group, thioether group or thiocarbonyl group, and derivatives thereof;

amino groups and derivatives thereof; and, imino groups and derivatives thereof. A derivative refers to a functional group containing at least one substituent selected from the group consisting of a cyano group, nitroso group, nitro group, isonitrile group and halogen atom.

The polyamine layer is preferably such that, simultaneous to being chemically modified by a modifying agent, a portion of the amino groups derived from the polyamine serving as raw material preferably remain. As a result of the polyamine having amino groups, the residual amino groups are able to coordinate with a metal salt optionally contained in the polyamine layer, thereby enabling the metal salt to be highly dispersed and rigidly retained. As a result, the resulting gas separation membrane can be preferably applied to separation of, for example, olefins and paraffin.

The chemical modification rate of the polyamine is preferably 1% to 80%, more preferably 1% to 50%, and particularly preferably 1% to 31%. This is because being unable to obtain high permeability in the case the modification rate is excessively low, and being unable to obtain a practical level of separation performance in the case the modification rate is excessively high, are both taken into consideration.

Chemical modification rate in the present description is a value calculated according to the equation indicated below.

Chemical modification rate (mol %)=(number of moles of chemically modified functional groups among all functional groups of the polyamine)/(number of moles of repeating units of the polyamine)

As was previously described, the functional group of the polyamine refers to an amino group, hydroxyl group, carboxyl group or aldehyde group, and is preferably an amino group.

The presence of amino groups in the polyamine layer can be confirmed by, for example, infrared spectroscopic analysis. Since amino groups demonstrate infrared absorbance in a region having a wave number of 3,500 $cm^{-1}$ to 3,000 $cm^{-1}$, investigating peaks within this region makes it possible to confirm the presence or absence of amino groups.

Infrared spectroscopic analysis can be carried out, for example, by ATR-IR under the conditions indicated below.

IR apparatus: Bruker, Model "LUMOS"
Measurement method: ATR (Ge crystals)
Wave number resolution; 4 $cm^{-1}$
Number of integrations: 64
Measured region: 50 μm×50 μm
Analysis depth: Less than 1 μm Whether or not the polyamine has been chemically modified can be confirmed by, for example, elemental analysis, time-of-flight secondary ion mass spectrometry (TOF-SIMS), solid-state nuclear magnetic resonance (solid-state NMR) or X-ray photoelectron spectroscopy (XPS).

In the case of elemental analysis, for example, the element ratios (wt %) for each of the elements of carbon (C), nitrogen (N) and oxygen (O) as measured for a measurement sample that has been dried for 2 hours at 105° C. are preferably such that $44.1<C\leq55.0$, $6.0\leq N\leq16.0$ and $28.0\leq O<41.9$, and more preferably such that $44.1<C\leq48.7$, $7.0\leq N\leq13.0$ and $33.0\leq O<41.9$.

Elemental analysis can be carried out, for example, under the conditions indicated below.

Apparatus: Yanaco, Model "MT-6"

Polyamine in which each of the element ratios for carbon, nitrogen and oxygen satisfies the aforementioned relational expressions is chemically modified within a desired range. Consequently, a highly permeable separation membrane having extremely high practicality is obtained, thereby making this preferable.

In the case C is less than 44.1 or O exceeds 41.9, it may be difficult to obtain a practical level of permeability. In the case C is greater than 55.0 or O is less than 28.0, a desired degree of separation may be unable to be obtained. If the aforementioned value of N is less than 6.0 or exceeds 16.0, at least one of either insufficient gas permeability or insufficient degree of separation may occur, thereby making this undesirable.

The number-average molecular weight of the polyamine is preferably 100,000 to 500,000, and more preferably 100,000 to 200,000, from the viewpoint of achieving a favorable balance between gas separation performance and permeability. This number-average molecular weight is the value obtained by measuring by size exclusion chromatography using pullulan standards.

The polyamine layer may have a crosslinked structure. A crosslinked structure in the present description refers to a structure in which at least two or more mutually non-adjacent repeating units of polyamine are linked by covalent bonds through a crosslinked structure. From the viewpoint of ease of production, this crosslinked structure preferably contains one or more types of structures selected from the group consisting of a structure having an amide group, a structure having an imide group, a structure having an imino group, a structure having a urea group, a structure having a pyridinium group, a structure having a carbonate group, a structure having a urethane group, a structure having a sulfonyl group, and a structure having an ester group.

The presence and type of crosslinked structures in the polyamine layer can be confirmed by, for example, infrared spectroscopic analysis, X-ray photoelectron spectroscopy (XPS), solid-state nuclear magnetic resonance (solid-state NMR) or time-of-flight secondary ion mass spectrometry (TOF-SIMS).

During infrared spectroscopic analysis, amide groups or imide groups exhibit absorbance in a region having a wave number of 1,700 $cm^{-1}$ to 1,500 $cm^{-1}$, urea groups, carbonate groups or urethane groups exhibit absorbance in a region having a wave number of 1,900 $cm^{-1}$ to 1,650 $cm^{-1}$, pyridinium groups exhibit absorbance in a region having a wave number of 1,700 $cm^{-1}$ to 1,500 $cm^{-1}$, sulfone groups exhibit absorbance in a region having a wave number of 1,350 $cm^{-1}$ to 1,300 $cm^{-1}$, and ester groups exhibit absorbance in a region having a wave number of 1,300 $cm^{-1}$ to 1,000 $cm^{-1}$.

Infrared spectroscopic analysis for investigating crosslinked structure can be carried out, for example, by ATR-IR under the conditions indicated below.

IR apparatus: Bruker, Model "LUMOS"
Measurement method: ATR (Ge crystals)
Wave number resolution; 4 $cm^{-1}$
Number of integrations: 64
Measured region: 50 μm×50 μm
Analysis depth: Less than 1 μm The polyamine layer is preferably such that, together with having a crosslinked structure as described above, a portion of the amino groups derived from the polyamine serving as raw material preferably remain. As a result of the polyamine having amino groups, it becomes easy to coordinate with a metal salt optionally contained in the polyamine layer. As a result, the resulting gas separation membrane can be preferably applied to separation of, for example, olefins and paraffin.

The presence of amino groups in the polyamine layer can be confirmed by, for example, infrared spectroscopic analysis. Since amino groups exhibit infrared absorption in a region having a wave number of 3,500 $cm^{-1}$ to 3,000 $cm^{-1}$, investigating peaks within this region makes it possible to confirm the presence or absence of amino groups.

Infrared spectroscopic analysis for determining the presence of amino groups can be carried out by, for example, ATR-IR under the same conditions as infrared spectroscopic analysis for investigating crosslinked structure as previously described.

The polyamine layer in the gas separation membrane of the present embodiment preferably has both a crosslinked structure and amino groups. The abundance ratio thereof can be evaluated using the functional group ratio defined as the ratio A/B of the total absorbance A, attributable to amide groups, imide groups, urea groups, pyridinium groups, imino groups, carbonate groups, urethane groups, sulfonyl groups and ester groups, to absorbance B, attributable to amino groups, as determined by infrared spectroscopic analysis. In the polyamine layer of the present embodiment, this functional group ratio is preferably 10 or less, more preferably 0.1 to 7.5, and even more preferably 0.9 to 5.0.

Infrared spectroscopic analysis for determining functional group ratio can be carried out by, for example, ATR-IR under the same conditions as infrared spectroscopic analysis for investigating crosslinked structure as previously described.

As a result of the polyamine layer in the gas separation membrane of the present embodiment having a crosslinked structure, not only is it possible for the gas separation membrane to realize both gas separation performance and permeability, but also enables the polyamine layer to have a practical level of mechanical strength, thereby making this preferable.

The polyamine layer in the gas separation membrane of the present embodiment may also contain a substance having affinity with olefins. The gas separation membrane in that case can be applied to, for example, separation of olefins and paraffin.

A metal salt is an example of the aforementioned substance having affinity for olefins.

The metal salt is preferably a metal salt containing one or more types of metal atoms selected from the group consisting of, for example, Ag and Cu. More preferably, the metal salt is a metal salt composed a metal ion selected from the group consisting of monovalent silver and monovalent copper or a complex ion thereof, and an anion selected from the group consisting of $F^-$, $Cl^-$, $Br^-$, $I^-$, $CN^-$, $NO_3^-$, $SCN^-$, $ClO_4^-$, $CF_3SO_3^-$, $BF_4^-$ and $PF_6^-$.

The concentration of metal salt in the polyamine layer is preferably 10% by weight to 70% by weight, more preferably 30% by weight to 70% by weight, and even more preferably 50% by weight to 70% by weight. If the concentration of metal salt is excessively low, the effect of improving gas separation performance may not be able to be obtained. If the concentration of metal salt is excessively high, problems involving increased production cost may occur.

The film thickness of the polyamine layer in the gas separation membrane of the present embodiment is preferably 0.01 μm to 3 μm, and more preferably 0.01 μm to 1 μm, from the viewpoint of achieving a favorable balance between gas separation performance and permeability. If the film thickness of the polyamine layer is excessively thin, high permeability may be unable to be obtained. If the film thickness of the polyamine layer is excessively thick, gas separation performance may be inadequate.

If the film thickness of the polyamine layer is set to 3 μm or less, undesirable three-dimensional network crosslinked structures are not formed in a drying step optionally carried out in the step for forming the polyamine layer, thereby making this preferable with respect to this point as well.

The film thickness of the polyamine layer can be measured by a method such as transmission electron microscopy (TEM), scanning electron microscopy (SEM), gas cluster ion beam/X-ray photoelectron spectroscopy (GCIB-XPS) or time-of-flight secondary ion mass spectrometry (TOF-SIMS).

TEM can be carried out, for example, under the conditions indicated below.

(Pretreatment)

The gas separation membrane is frozen and crushed for use as a measurement sample followed by embedding in epoxy resin after having coated the outer surface thereof with a Pt coating. After preparing ultrathin sections by slicing with an ultramicrotome (such as the Model "UC-6" manufactured by Leica), the sections are stained with $RuO_4$ for use as samples for microscopic observation.

(Measurement)

Measurement can be carried out at an accelerating voltage of 30 kV using the Model "S-5500" TEM manufactured by Hitachi.

TOF-SIMS can be carried out, for example, under the conditions indicated below using the Model "nanoTOF" manufactured by Ulvac-Phi.

Primary ion: $Bi_3^{++}$
Accelerating voltage: 30 kV
Ion current: Approx. 0.1 nA (as DC)

Analysis area: 200 μm×200 μm
Analysis time: 6 sec/cycle
Detected ions: Positive ions
Neutralization: Use of electron gun and Ar monomer
(Sputtering Conditions)
Sputtered ion: $Ar_{2500}^+$
Accelerating voltage: 20 kV
Ion current: Approx. 5 nA
Sputtering area: 600 μm×600 μm
Sputtering time: 10 min/cycle
Neutralization: Use of electron gun and Ar monomer
(Impregnation Layer)

In the gas separation membrane of the present embodiment, an impregnation layer of the present embodiment obtained by impregnating with polyamine may be formed on the polyamine side of the porous support.

This impregnation layer may be formed between the porous support and the polyamine layer with or without a distinct boundary there between. The proportion of polyamine in the impregnation layer may be the same in the direction of thickness or may have a graduated composition. Preferably, the content ratio of polyamine is high in the region that contacts the polyamine layer of the impregnation layer, after which the content ratio decreases gradually in the direction of depth, and may eventually reach zero at the location where the impregnation layer ends.

In the case the aforementioned polyamine layer contains a metal salt, the impregnation layer also contains a metal salt. The content ratio of metal salt in the impregnation layer is such that the weight ratio of metal salt based on the total weight of the polyamine and metal salt is roughly equal to the proportion of metal salt in the aforementioned polyamine layer.

The thickness of the impregnation layer is set from the viewpoint of the balance between separation performance and permeability in the resulting gas separation membrane. From this viewpoint, the thickness of the impregnation layer is preferably 20 μm or less and the ratio of the thickness of the impregnation layer to the thickness of the polyamine layer is preferably 5 or less, and the thickness of the impregnation layer is more preferably 5 μm or less and the ratio of the thickness of the impregnation layer to the thickness of the polyamine layer is more preferably 3 or less. If the thickness of the impregnation layer exceeds 20 μm, problems may occur such as one or both of permeability and separation factor failing to demonstrate high values for practical use. If the ratio of the thickness of the impregnation layer to the thickness of the polyamine layer exceeds 5, problems may similarly occur such as one or both of permeability and separation factor failing to demonstrate high values for practical use.

The thickness of the impregnation layer is preferably 0.1 μm or more, and the ratio of the thickness of the impregnation layer to the thickness of the polyamine layer is preferably 0.02 or more. If the thickness of the impregnation layer is excessively thin, problems such as peeling of the polyamine layer may occur.

The thickness of the impregnation layer can be determined from a distribution curve of relative element concentrations as measured by, for example, gas cluster ion beam/X-ray photoelectron spectroscopy (GCIB-XPS).

GCIB-XPS can be carried out, for example, under the conditions indicated below using the Model "Versa Probe II" manufactured by Ulvac-Phi.
(GCIB Conditions)
Accelerating voltage: 15 kV
Cluster size: $Ar_{2500}$
Cluster range: 3 mm×3 mm
Sample rotation during etching: Yes
Etching interval: 3 min/level
Sample current: 23 nA
Total etching time: 69 min
(XPS Conditions)
X-ray: 15 kV, 25 W
Beam size: 100 μm

[Performance of Gas Separation Membrane]

The gas separation membrane of the present embodiment containing a metal salt in a polyamine layer can be preferably used to separate olefins and paraffin. More specifically, when using a mixed gas composed of 40% by weight of propane and 60% by weight of propylene, setting the supply side gas flow rate to 190 cc/min, setting the permeation side gas flow rate to 50 cc/min and measuring in a humidified atmosphere under isobaric conditions at 30° C., the permeation rate Q of propylene gas is 15 GPU to 1,500 GPU and the separation factor α of propylene/propane is 50 to 1,000. The permeation rate Q of propylene gas is preferably 50 GPU to 1,500 GPU and more preferably 100 GPU to 1,500 GPU. The separation factor α of propylene/propane is preferably 100 to 1,000 and more preferably 150 to 1,000. These values are to be measured under conditions of a propylene partial pressure of 1 atmosphere or less, and more specifically, 0.6 atmospheres.

Performance of the gas separation membrane can be measured, for example, under the conditions indicated below.

Apparatus: Model "GTR20FMAK Isobaric Gas Permeability Measuring Device" manufactured by GTR Tec
Temperature: 25° C.

[Method for Producing the Gas Separation Membrane]

Next, an explanation is provided of the method for producing the gas separation membrane of the present embodiment.

The method for producing a gas separation membrane of the present embodiment at least comprises the following steps:

a porous support production step for producing a porous support, a coating solution production step for producing a coating solution composed of an aqueous solution containing a polyamine, and a coating step for coating the coating solution on the surface of the porous support.

The aforementioned method may also have an impregnation step for impregnating the porous support with a viscous aqueous solution prior to the coating step. In this case, a gas separation membrane having an impregnation layer can be easily produced.

The aforementioned method may also have a contact step for contacting the porous support after coating the coating solution with an aqueous solution containing a crosslinking agent before or after the coating step. In this case, a gas separation membrane provided with a polyamine layer having a crosslinked structure can be easily produced.

The aforementioned polyamine may be a polyamine subjected to chemical modification. In this case, a gas separation membrane provided with a polyamine layer containing a chemically modified polyamine can be easily produced.

A drying step for drying and removing solvent present in the coating solution from the porous support may also be carried out following the aforementioned coating.

(Porous Support Production Method)

The following provides an explanation of a method for producing a porous support preferably used in the present embodiment.

The porous support can be obtained by non-solvent-induced phase separation or thermally induced phase separation.

The following provides an explanation of the case of producing a hollow fiber membrane made of polyether sulfone by non-solvent-induced phase separation.

First, polyether sulfone (PES) is dissolved in a solvent to prepare a PES solution. The molecular weight of the PES used in the present embodiment as the number-average molecular weight in terms of polystyrene measured by size exclusion chromatography is preferably 2,000 to 100,000 and more preferably 10,000 to 50,000. This is because, if the molecular weight is excessively low, problems may occur such as failing to demonstrate a high level of durability for practical use, while conversely, if the molecular weight is excessively high, problems may occur such as difficulty in producing the porous support.

In the present embodiment, the concentration of PES in the aforementioned PES solution is preferably 15% by weight to 50% by weight and more preferably 25% by weight to 40% by weight. This is because, if the concentration of PES is excessively low, problems may occur such as failing to demonstrate a high level of durability for practical use, while conversely, if the concentration of PES is excessively high, problems may occur such as difficulty in producing the porous support.

Examples of solvents of the PES solution include good solvents such as N-methyl-2-pyrrolidone, dimethylacetoamide, dimethylformamide or dimethylsulfoxide, and poor solvents such as glycerin, ethylene glycol, triethylene glycol or polyethylene glycol. The weight ratio of good solvent/poor solvent in the PES solution is preferably 97/3 to 40/60 in consideration of enhancing safety in the case of using the PES solution as spinning dope and facilitating the obtaining of a uniform membrane structure.

Spinning is carried out using the PES solution obtained in the manner described above as spinning dope. The PES solution is discharged from the outer slits of a double-walled cylindrical nozzle, while a core liquid is discharged from the central opening. A fluid that is inert with respect to the PES solution serving as the spinning dope is used for the core liquid. An inert fluid refers to a fluid that does not cause coagulation of the spinning dope and is immiscible with the spinning dope, and may be a liquid or gas.

Examples of inert liquids include nonane, decane, undecane, dodecane, liquid paraffin and isopropyl myristate. Examples of inert gases include nitrogen and argon. When a fluid that is inert with respect to the spinning dope is used for the core liquid, a structure in which the structure of the hollow fiber membrane is uniform is easily acquired, and since membrane structure easily changes when affected by surface tension during drying, this inert fluid can be applied preferably. The discharged amount of the core liquid is preferably 0.1 times to 10 times, and more preferably 0.2 times to 8 times, the discharged amount of the PES solution serving as spinning dope. A porous support of a preferable form can be produced by suitably controlling the discharged amount of core liquid and the discharged amount of PES solution serving as spinning dope to within the aforementioned ranges.

After having passed through a hollow transfer line, the spinning dope discharged from the nozzle is immersed in a coagulation bath followed by subjecting to coagulation and phase separation to form a hollow fiber membrane. Water, for example, can be used for the coagulation liquid in the coagulation tank.

While still wet after having been lifted out of the coagulation bath, the hollow fiber membrane is cleaned in a cleaning tank to remove solvent and other substances followed by drying by passing through a dryer.

A hollow fiber porous support can be obtained in the manner described above.

Only one such hollow fiber porous support may be fed to the next step or a plurality of supports may be fed to the next step collectively.

(Impregnation Step)

The porous support obtained in the manner described above may be fed to the subsequent coating step directly or may be fed to the coating step after having carried out an impregnation step for impregnating the porous support with a viscous aqueous solution.

In the present embodiment, the viscosity of the viscous aqueous solution is preferably 1 cP to 200 cP, more preferably 5 cP to 150 cP, and even more preferably 10 cP to 100 cP. This is because, if the viscosity of the viscous aqueous solution is excessively low, problems may occur such as the use of the viscous aqueous solution being ineffective, while conversely, if the viscosity of the viscous aqueous solution is excessively high, problems may occur such as the viscous aqueous solution not adequately impregnating the porous support.

A solute that mixes with water at an arbitrary ratio can be used for the solute of the viscous aqueous solution in the present embodiment. For example, glycol or glycol ether is used preferably. Examples of glycols include glycerin, ethylene glycol, diethylene glycol, triethylene glycol, propylene glycol, dipropylene glycol, tripropylene glycol and polyethylene glycol, while examples of glycol ethers include ethylene glycol monomethyl ether, ethylene glycol monoethyl ether, ethylene glycol monobutyl ether, ethylene glycol isopropyl ether, ethylene glycol dimethyl ether, 3-methyl-3-methoxybutanol, ethylene glycol t-butyl ether, 3-methyl-3-methoxybutanol, 3-methoxybutanol, diethylene glycol monomethyl ether, diethylene glycol monobutyl ether, triethylene glycol monomethyl ether, triethylene glycol monobutyl ether, propylene glycol monomethyl ether, propylene glycol propyl ether, dipropylene glycol monomethyl ether and tripropylene glycol monomethyl ether. One or more types selected from glycerin, ethylene glycol and propylene glycol are preferable. These solutes may be used alone or may be used as a mixture.

The concentration of solute in the viscous aqueous solution is preferably 10% by weight to 90% by weight and more preferably 20% by weight to 80% by weight. The viscous aqueous solution can be prepared by mixing the solute with water within these ranges and adjusting to the aforementioned viscosity range.

The pH of the viscous aqueous solution is preferably 4 to 10 and more preferably 5 to 9. This is because impregnation of the porous support with the viscous aqueous liquid may not occur adequately if the pH of the viscous aqueous solution is excessively low or excessively high.

The immersion temperature in the case of immersing the porous support in the viscous aqueous solution is preferably 0° C. to 100° C. and more preferably 20° C. to 80° C. This is because, if the immersion temperature is excessively low, problems may occur such as impregnation of the porous support with the viscous aqueous solution occurring inadequately, while conversely, if the immersion temperature is excessively high, problems may occur such as excessive volatilization of the solvent (water) in the viscous aqueous solution during immersion.

The immersion time is preferably 15 minutes to 5 hours and preferably 30 minutes to 3 hours. This is because, if the immersion time is excessively short, problems may occur such as impregnation of the porous support with the viscous aqueous solution occurring inadequately, while conversely, if the immersion time is excessively long, problems may occur such as a drop in production efficiency of the gas separation membrane.

(Coating Liquid Production Step)

The coating liquid used in the present embodiment is an aqueous solution that at least contains a polyamine. This polyamine may be polyamine that has been subjected to chemical modification (chemically modified polyamine) or a polyamine that has not been subjected to chemical modification.

—Method of Producing Chemically Modified Polyamine—

A chemically modified polyamine can be obtained by reacting the polyamine with a modifying agent.

The modifying agent preferably has at least one type of functional group selected from the group consisting of an imidazole group, isobutyl group and glyceryl group, and a reactive group capable of reacting with polyamine. The aforementioned at least one type of functional group selected from the group consisting of an imidazole group, isobutyl group and glyceryl group can be an aliphatic group or aromatic group.

The aforementioned reactive group capable of reacting with polyamine is a group that is capable of reacting with an amino group, hydroxyl group, carboxyl group or aldehyde group of the polyamine, and examples thereof include one or more types of groups selected from the group consisting of a carboxyl group, carboxylic halide group, carboxylic anhydride group, aldehyde group, ketone group and isocyanate group.

In addition to the aforementioned functional groups and reactive groups, the modifying agent preferably uses one or more types of groups selected from the group consisting of alkyl groups, such as a methyl group, ethyl group, propyl group, isopropyl group, butyl group, isobutyl group, s-butyl group, t-butyl group, pentyl group, cyclopentyl group, isopentyl group, hexyl group, cyclohexyl group, heptyl group, octyl group, nonyl group or decyl group, and derivatives thereof;

alkenyl groups such as an allyl group or vinyl group, and derivatives thereof;

aromatic groups such as a phenyl group, phenol group, pyridyl group, imidazole group, benzyl group, benzal group, quinolyl group, naphthyl group, indole group, phenol group, thiophene group, oxazole group or benzoyl group, and derivatives thereof;

carbonyl groups such as an acetyl group, aldehyde group, ester group, imide group or amide group, and derivatives thereof;

cationic groups such as an ammonium group or guanidino group, and derivatives thereof;

alkoxy groups such as a methoxy group or ethoxy group, and derivatives thereof;

hydroxyl groups such as a glyceryl group, and derivatives thereof;

sulfur-containing groups such as a sulfonamide group, sulfonate group, sulfonoxide group, thiol group, thioether group or thiocarbonyl group, and derivatives thereof;

amino groups and derivatives thereof; and, imino groups and derivatives thereof. A derivative refers to a functional group containing at least one substituent selected from the group consisting of a cyano group, nitroso group, nitro group, isonitrile group and halogen atom.

Specific examples of modifying agents include isobutyl aldehyde, glyceryl aldehyde, imidazole-4-carboxyaldehyde, 4-imidazolecarboxylic acid, isobutyric chloride, isobutyric acid chloride, glyoxylic acid and 1,3-propanesultone.

One type of these modifying agents may be used or two or more types may be used as a mixture.

The reaction between the polyamine and modifying agent is preferably carried out in a water-based solution. Water or a mixed solvent composed of water and organic solvent can be used for the solvent in the water-based solution. The content ratio of organic solvent in the mixed solvent is preferably within the range of 80% by weight or less based on the total amount of solvent. Examples of organic solvents used here include alcohols such as methanol, ethanol or propanol and polar solvents such as acetonitrile, acetone, dioxane or tetrahydrofuran. These organic solvents may be used alone or two or more types may be used as a mixture.

The reaction is carried out such that the concentrations of polyamine and modifying agent are preferably 0.1% by weight to 10% by weight, and more preferably 0.5% by weight to 5% by weight, respectively. The reaction proceeds adequately if the concentrations of polyamine and modifying agent are each 0.1% by weight or more.

The reaction temperature is preferably 0° C. to 100° C. and more preferably 20° C. to 80° C. If the temperature is excessively low, there is the problem of the reaction not proceeding adequately, while conversely, if the temperature is excessively high, there is the problem of the solvent ending up volatilizing.

The reaction time is preferably 6 hours to 36 hours and more preferably 12 hours to 24 hours. If the reaction time is excessively short, there is the problem of the reaction not proceeding adequately, while conversely, if the reaction time is excessively long, there is the problem of poor production efficiency.

In the case of using a compound having an aldehyde group or ketone group for the modifying agent, the solution obtained following the reaction is preferably used to prepare the coating solution after having reduced with a reducing agent. Examples of reducing agents include sodium borohydride and sodium cyanoborohydride. Resistance to hydrolysis can be imparted since it is possible to convert to an amine by reducing the Schiff base formed by the reaction between an amino group of the polyamine and an aldehyde group or ketone group.

In the case of using a compound having a carboxyl group for the modifying agent, the reaction of the polyamine is preferably carried out after having adding a condensing agent of the reaction solution. Examples of condensing agents include dicyclohexylcarbodiimide, diisopropylcarbodiimide and 1-ethyl-3-(3-dimethylaminopropyl)carbodiimide hydrochloride. The addition of a condensing agent enables the reaction to proceed adequately.

Following the reaction, the solution may be washed with, for example, a basic aqueous solution, water or an organic solvent as necessary.

A chemically modified polyamine can be obtained in the manner described above.

The modification rate of the chemically modified polyamine can be calculated by, for example, nuclear magnetic resonance (NMR) or infrared spectroscopic analysis. These methods are as previously described.

—Production of Coating Solution—

The coating solution of the present embodiment can be produced by dissolving a desired polyamine, or chemically modified polyamine obtained in the manner described above, in an aqueous solvent. In the case of using a chemically modified polyamine, the reaction solution may be used as is to prepare the coating solution.

The polyamine concentration in the coating solution is preferably 0.2% by weight to 10% by weight and more preferably 0.5% by weight to 5% by weight. If the polyamine concentration is less than 0.2% by weight, a highly practical gas separation membrane may be unable to be obtained.

The coating solution may contain an organic solvent within a range of 80% by weight or less based on the total amount of solvent. Examples of organic solvents used here include alcohols such as methanol, ethanol or propanol, and polar solvents such as acetonitrile, acetone, dioxane or tetrahydrofuran. These organic solvents may be used alone or two or more types may be used as a mixture.

The aqueous polyamine solution may also contain a surfactant. A nonionic surfactant is preferably used for the surfactant from the viewpoints of eliminating electrostatic repulsion between the polyamine and crosslinking agent to be subsequently described (in the case of the use thereof) and uniformly dissolving in an acidic, neutral or basic aqueous solution.

Examples of nonionic surfactants include long chain fatty acid esters of polyoxyethylene and fluorine-based surfactants having a perfluoro group. Specific examples thereof include long chain fatty acid esters of polyoxyethylene such as Tween 20 (polyoxyethylene sorbitan monolaurate), Tween 40 (polyoxyethylene sorbitan monopalmitate), Tween 60 (polyoxyethylene sorbitan monostearate), Tween 80 (polyoxyethylene sorbitan monooleate) (all of which are manufactured by Tokyo Chemical Industry Co., Ltd.), Triton X-100, Pluronic F-68 or Pluronic F-127, and fluorine-based surfactants having a perfluoro group such as fluorine-based surfactants FC-4430 or FC-4432 (manufactured by 3M), S-241, S-242 or S-243 (manufactured by AGC Seimi Chemical Co., Ltd.), F-444 or F-477 (manufactured by DIC Corp.).

The concentration of surfactant in the coating solution is preferably 0.001% by weight to 1% by weight, and more preferably 0.01% by weight to 0.5% by weight, based on the total amount of coating solution. This is because, if the concentration of surfactant is excessively high, problems may occur such as it becoming difficult to dissolve the surfactant in the coating solution, while conversely, if the concentration of surfactant is excessively low, problems may occur such as a decrease in gas separation performance of the resulting gas separation membrane.

—Coating Step—

In the coating step, the porous support, which may or may not have been immersed in a viscous aqueous solution, is contacted with the coating solution as described above. Examples of preferable contact methods at this time include dip coating (immersion), gravure coating, die coating and spray coating.

The temperature of the coating solution when contacted with the porous support is preferably 0° C. to 100° C. and more preferably 20° C. to 80° C. If the contact temperature is excessively low, problems may occur such as the coating solution not being uniformly coated on the porous support, while conversely, if the contact temperature is excessively high, problems may occur such as excessive volatilization of the solvent (such as water) of the coating solution during contact.

The contact time in the case of contacting by immersion (immersion time) is preferably 15 minutes to 5 hours and more preferably 30 minutes to 3 hours. If the contact time is excessively short, problems may occur such as inadequate coating of the porous support, while conversely, if the contact time is excessively long, problems may occur such as a drop in production efficiency of the gas separation membrane.

—Drying Step—

A drying step (solvent removal step) may be optionally provided after the aforementioned coating step. This drying step can be carried out by, for example, allowing the coated porous support to stand undisturbed preferably for 5 minutes to 5 hours and more preferably for 10 minutes to 3 hours in an environment preferably at 80° C. to 160° C. and more preferably at 120° C. to 160° C. This is because, in the case the drying temperature is excessively low and/or in the case the drying time is excessively short, problems may occur such as failure to adequately dry and remove the solvent, while conversely, in the case the drying temperature is excessively high and/or in the case the drying time is excessively long, problems may occur such as an increase in production cost or a decrease in production efficiency.

(Method of Producing Gas Separation Membrane in which Polyamine Layer has a Crosslinked Structure)

A crosslinked structure can be formed in the polyamine layer by contacting the polyamine with a crosslinking agent.

The crosslinking agent is preferably contacted with the polyamine in a state in which it is contained in an aqueous solution.

Methods used to obtain a crosslinked structure of the polyamine consist of a method consisting of contacting the porous support and a crosslinking agent solution followed by contacting with a coating solution containing the polyamine, a method consisting of contacting the porous support and coating solution followed by contacting with a crosslinking agent solution, and a method consisting of contacting the porous support and coating solution followed by carrying out an optional step in the form of a drying step and then contacting with a crosslinking agent solution.

The crosslinking agent contained in the crosslinking agent solution is a compound having one or more types of groups selected from the group consisting of an acid halide group, carboxylic anhydride group, aldehyde group, ketone group, isocyanate group and vinylsulfone group as a reactive group capable of reacting with a polyamine having an amino group. The crosslinking agent is preferably an aliphatic or aromatic compound having two or more of one or more types of groups selected from these groups in a single molecule thereof. The two or more reactive groups present in a single molecule may be the same or different.

Examples of crosslinking agents in the present embodiment include:

aromatic acid halides such as a trimesic acid halide, isophthalic acid halide, terephthalic acid halide or trimellitic acid halide;

aliphatic carboxylic anhydrides such as 1,2,3,4-butanetetracarboxylic anhydride;

aromatic isocyanates such as toluene diisocyanate;

aromatic aldehydes such as terephthalaldehyde or isophthalaldehyde, aliphatic aldehydes such as glutaraldehyde or malondialdehyde;

aliphatic ketones such as 2,5-hexanedione;

and vinylsulfones such as VS-B or VS-C (manufactured by Fuji Film Fine Chemicals).

These crosslinking agents may be used alone or two or more types may be used as a mixture.

The concentration of the crosslinking agent solution in the present embodiment is preferably 0.1% by weight to 10% by weight and more preferably 0.5% by weight to 5% by weight. A concentration of the crosslinking agent solution of 0.1% by weight or more facilitates the formation of a crosslinked structure on the porous support.

The solvent in the crosslinking agent solution is preferably an aqueous solvent. An aqueous solvent refers to water or a mixed solvent of water and an organic solvent. In the case of using a mixed solvent, the organic solvent may be contained within the range of 80% by weight or less based on the total amount of solvent. Examples of organic solvents used here include alcohols such as methanol, ethanol or propanol, and polar solvents such as acetonitrile, acetone, dioxane or tetrahydrofuran. These organic solvents may be used alone or two or more types may be used as a mixture.

The crosslinking agent solution may contain a surfactant. A nonionic surfactant is preferably used for the surfactant from the viewpoints of eliminating electrostatic repulsion between the crosslinking agent and polyamine, and uniformly dissolving in an acidic, neutral or basic aqueous solution. Examples of nonionic surfactants include long chain fatty acid esters of polyoxyethylene and fluorine-based surfactants having a perfluoro group. Specific examples thereof include long chain fatty acid esters of polyoxyethylene such as Tween 20 (polyoxyethylene sorbitan monolaurate), Tween 40 (polyoxyethylene sorbitan monopalmitate), Tween 60 (polyoxyethylene sorbitan monostearate), Tween 80 (polyoxyethylene sorbitan monooleate) (all of which are manufactured by Tokyo Chemical Industry Co., Ltd.), Triton X-100, Pluronic F-68 or Pluronic F-127, and fluorine-based surfactants having a perfluoro group such as fluorine-based surfactants FC-4430 or FC-4432 (manufactured by 3M), S-241, S-242 or S-243 (manufactured by AGC Seimi Chemical Co., Ltd.).

The concentration of surfactant in the crosslinking agent solution is preferably 0.001% by weight to 1% by weight and preferably 0.01% by weight to 0.5% by weight based on the total amount of the crosslinking agent solution. This is because, if the concentration of surfactant is excessively high, problems may occur such as it being difficult to dissolve the surfactant in the coating solution, while conversely, if the concentration of surfactant is excessively low, problems may occur such as a decrease in gas separation performance in the resulting gas separation membrane.

Preferable examples of the method used to contact the porous support with the crosslinking agent solution include dip coating (immersion), gravure coating, die coating and spray coating.

The temperature of the crosslinking agent solution when contacting with the porous support is preferably 0° C. to 100° C. and more preferably 20° C. to 80° C. If the contact temperature is excessively low, problems may occur such as the crosslinking agent solution not being uniformly coated on the porous support, while conversely, if the contact temperature is excessively high, problems may occur such as excessive volatilization of the solvent (water) of the crosslinking agent solution during contact.

The contact time in the case of contacting by immersion (immersion time) is preferably 15 minutes to 5 hours and more preferably 30 minutes to 3 hours. If the contact time is excessively short, problems may occur such as inadequate coating of the porous support, while conversely, if the contact time is excessively long, problems may occur such as a drop in production efficiency of the gas separation membrane.

A drying step (solvent removal step) may be optionally provided after having contacted the porous support with the crosslinking agent solution. This drying step can be carried out by, for example, allowing the porous support to stand undisturbed preferably for 5 minutes to 5 hours and more preferably for 10 minutes to 3 hours in an environment preferably at 80° C. to 160° C. and more preferably at 120° C. to 160° C. after having contacted the crosslinking agent solution. In the case the drying temperature is excessively low and/or in the case the drying time is excessively short, problems may occur such as failure to adequately dry the solvent, while conversely, in the case the drying temperature is excessively high and/or in the case the drying time is excessively long, problems may occur such as an increase in production cost or a decrease in production efficiency.

(Method of Producing Gas Separation Membrane having Polyamine Layer Containing Metal Salt)

A gas separation membrane in which the polyamine layer contains a metal salt can be produced by further contacting a porous support obtained in the manner described above with an aqueous metal salt solution containing a desired metal salt. A drying step may be optionally carried out thereafter.

The concentration of metal salt in the aforementioned aqueous metal salt solution is preferably 0.1 mol/L to 50 mol/L. If the concentration of metal salt in the aqueous metal salt solution is less than 0.1 mol/L, highly practical separation performance may not be demonstrated when using the resulting gas separation membrane to separate olefins and paraffin. If this concentration exceeds 50 mol/L, problems occur such as an increase in raw material cost.

Contact treatment on the gas separation membrane with the aqueous metal salt solution is preferably carried out by immersion. The temperature of the aqueous solution during immersion is preferably 10° C. to 90° C. and more preferably 20° C. to 80° C. If the immersion temperature is excessively low, problems may occur such as the polyamine layer not being adequately impregnated with the metal salt, while conversely, if the immersion temperature is excessively high, problems may occur such as excessive volatilization of the solvent (water) of the aqueous metal salt solution during immersion.

The drying step after having contacted the gas separation membrane with the aqueous metal salt solution can be carried out under the same conditions as the drying step optionally carried out after having contacted the porous support with the crosslinking agent solution.

The gas separation membrane of the present embodiment can be produced according to the production conditions described above.

(Formation of Impregnation Layer)

The aforementioned production method does not have an independent production step for forming an impregnation layer. However, according to the production method comprising the aforementioned series of steps, since a portion of the polyamine penetrates the surface of the porous support in the direction of depth, the penetrated portion becomes an impregnation layer in the present embodiment.

EXAMPLES

The following provides a more detailed explanation of the present embodiment using examples. However, the present invention is not limited in any way to these examples.

Example 1-1

4.00 g of chitosan (number-average molecular weight: approx. 100,000), 0.358 g of isobutyl aldehyde, 4.50 g of acetic acid and 392 g of water were mixed followed by stirring for 24 hours at 25° C. Subsequently, pH was adjusted to about 10 with 1 N aqueous sodium hydroxide solution followed by filtering out the precipitate that formed. The resulting precipitate was washed with distilled water and ethanol followed by drying overnight to obtain 3.10 g of isobutyl-modified chitosan. The isobutyl modification rate was calculated by proton nuclear magnetic resonance spectroscopic analysis (1H-NMR). 1H-NMR was carried out by dissolving the resulting isobutyl-modified chitosan in a mixed solvent of heavy water and deuterated trifluoroacetic acid (mixing ratio: 10:1) to a concentration of 10 mg/mL and using deuterated chloroform as a standard. The modification rate is shown in Table 1. 1H-NMR was carried out under the conditions indicated below.

Apparatus: Model "JNM-GSX400G" (400 MHz), JEOL

Measuring temperature: 25° C.

Number of integrations: 16

Examples 1-2, 1-3, 1-5, 1-7, 1-8 and 1-13 to 1-16

Chemically modified chitosan was obtained according to the same method as Example 1-1 with the exception of using equal amounts of chitosan having the number-average molecular weights shown in Table 1 as polyamine instead of the chitosan having a number-average molecular weight of approximately 100,000, and using the types and amounts of modifying agents shown in Table 1 instead of 0.358 g of isobutyl aldehyde. Modification rates were measured using the same method as in Example 1-1. The yields and modification rates of the chemically modified chitosan are shown in Table 1.

Example 1-4

4.00 g of chitosan, 0.358 g of isobutyl aldehyde, 4.50 g of acetic acid and 392 g of water were mixed followed by stirring for 24 hours at 25° C. Subsequently, pH was adjusted to about 5 with 1 N aqueous sodium hydroxide solution followed by the gradual addition of 1.41 g of sodium borohydride and stirring for 3 hours at room temperature. Subsequently, pH was adjusted to about 10 with 1 N aqueous sodium hydroxide solution followed by filtering out the precipitate that formed. The resulting precipitate was washed with distilled water and ethanol followed by drying overnight to obtain 3.56 g of isobutyl-modified chitosan. The isobutyl modification rate was measured using the same method as in Example 1-1. The modification rate is shown in Table 1.

Examples 1-4, 1-6 and 1-9 to 1-12

Chemically modified chitosan was obtained according to the same method as Example 1-4 with the exception of using the types and amounts of modifying agents shown in Table 1 instead of 0.358 g of isobutyl aldehyde. Modification rate was measured using the same method as in Example 1-1. A mixture of two types of modifying agents was used in Example 1-6. The yields and modification rates of the chemically modified chitosan are respectively shown in Table 1.

TABLE 1

| | Polyamine | | Modifying Agent | | | | Chemically Modified Polyamide | | |
| --- | --- | --- | --- | --- | --- | --- | --- | --- | --- |
| | | Number- | | Amt. Used | | | | Chemically Modifying Group | |
| | | average | | | Eq. | | | | |
| | Type | molecular weight | Type | Weight (g) | (mol/mol) | Reaction pH | Yield (g) | Bonding Mode | Type | Modification Rate (mol %) |
| Example 1-1 | Chitosan | 100,000 | Isobutyl aldehyde | 0.358 | 0.2 | 3 | 3.05 | Imine | Isobutyl | 4.2 |
| Example 1-2 | Chitosan | 100,000 | Imidazole-4-carboxyaldehyde | 2.38 | 1 | 3 | 3.05 | Imine | Imidazole | 35 |
| Example 1-3 | Chitosan | 100,000 | Glyceryl aldehyde | 2.23 | 1 | 3 | 3.05 | Imine | Glyceryl | 31 |
| Example 1-4 | Chitosan | 100,000 | Isobutyl aldehyde | 0.358 | 0.2 | 5 | 3.56 | Secondary amine | Isobutyl | 26 |
| Example 1-5 | Chitosan | 100,000 | Imidazole-4-carboxyaldehyde | 11.9 | 5 | 3 | 2.08 | Imine | Imidazole | 41 |
| Example 1-6 | Chitosan | 100,000 | Isobutyl aldehyde | 1.78 | 1 | 5 | 3.56 | Secondary amine | Isobutyl | 6.1 |
| | | | Imidazole-4-carboxyaldehyde | 2.38 | 1 | | | amine | Imidazole | 4.9 |
| Example 1-7 | Chitosan | 100,000 | 4-imidazole carboxylic acid | 0.556 | 0.2 | 3 | 2.78 | Amide | Imidazole | 1.9 |
| Example 1-8 | Chitosan | 100,000 | Isobutyric acid chloride | 2.64 | 1 | 3 | 2.78 | Amide | Isobutyl | 18 |
| Example 1-9 | Chitosan | 100,000 | Imidazole-4-carboxyaldehyde | 1.19 | 0.5 | 5 | 2.12 | Secondary amine | Imidazole | 22 |
| Example 1-10 | Chitosan | 500,000 | Imidazole-4-carboxyaldehyde | 0.714 | 0.3 | 5 | 1.87 | Secondary amine | Imidazole | 12.7 |
| Example 1-11 | Chitosan | 100,000 | Isobutyl aldehyde | 1.79 | 1 | 5 | 1.89 | Secondary amine | Isobutyl | 31 |
| Example 1-12 | Chitosan | 100,000 | Isobutyl aldehyde | 0.179 | 0.1 | 5 | 1.64 | Secondary amine | Isobutyl | 3.5 |
| Example 1-13 | Chitosan | 100,000 | Isobutyl aldehyde | 3.58 | 2 | 3 | 2.86 | Imine | Isobutyl | 48 |
| Example 1-14 | Chitosan | 100,000 | Imidazole-4-carboxyaldehyde | 23.8 | 10 | 3 | 1.87 | Imine | Imidazole | 75 |
| Example 1-15 | Chitosan | 100,000 | Glyoxylic acid | 2.72 | 1 | 3 | 2.56 | Imine | Methyl carboxylic acid | 27 |
| Example 1-16 | Chitosan | 100,000 | 1,3-propanesultone | 2.72 | 1 | 3 | 2.33 | Secondary amine | Sulfonic acid | 29 |

In the following Examples 2-1 to 2-16, 3-1 to 3-3 and 4-1 to 4-7 and Comparative Examples 2-1 to 2-3, a polyamine layer was formed on a porous support followed by investigating the gas separation performance thereof. A porous support, obtained by bundling 200 hollow fibers composed of polyether sulfone and having an inner diameter of 300 µm, surface pore diameter of 50 nm and length of 20 cm and housing in a cylindrical container to form a package, was used for the porous support.

Example 2-1

The aforementioned support was immersed in an aqueous polyamine solution having the composition indicated below (liquid temperature: 25° C.) at a rate of 1 cm/sec, and after submerging the entire support in the aforementioned aqueous solution, the support was allowed to stand undisturbed therein for 5 seconds. Subsequently, the support was lifted out at the rate of 1 cm/sec followed by heating for 10 minutes at 120° C. to produce a hollow fiber gas separation membrane.

The composition of the aqueous polyamine solution was as indicated below.

Aqueous solution containing:
polyamine: 1% by weight isobutyl-modified chitosan produced in Example 1-1,
surfactant: Novec FC-4430 (trade name, 3M, fluorine-based surfactant having a perfluoroalkyl group), 0.01% by weight, and
other components: 1% by weight acetic acid.

The hollow fiber gas separation membrane produced in this manner was immersed for 3 days in a 0.8 M aqueous sodium hydroxide solution (solvent: mixture of ethanol and water (volume ratio: 80:20)) followed by washing 5 times with distilled water. Subsequently, the hollow fiber gas separation membrane was immersed for 24 hours in 7 M aqueous silver nitrate solution to obtain a hollow fiber gas separation membrane containing silver salt. The weights of the polyamine layer before and after containing this silver salt were measured before and after immersion in the aqueous silver nitrate solution with an electronic balance, and when those weights were compared, the concentration of silver salt (silver nitrate) contained in the polyamine layer was determined to be 67% by weight.

The permeation rates of propane and propylene were measured using this hollow fiber gas separation membrane containing silver salt.

Measurements were carried out at a measuring temperature of 30° C. using a mixed gas composed of propane and propylene (propane:propylene=40:60 (weight ratio)) on the permeation side and using helium on the supply side, setting the supply side gas flow rate to 50 cc/min, setting the permeation side gas flow rate to 50 cc/min, and measuring under isobaric conditions in a humidified atmosphere. The results are shown in Table 2.

Measurement of the permeation rates of propane and propylene were carried out under the conditions indicated below.

Apparatus: Model "GTR20FMAK Isobaric Gas Permeability Measuring Device", GTR Tec
Measuring temperature: 25° C.

Examples 2-2 to 2-16 and Comparative Examples 2-1 to 2-3

The permeation rates of propane and propylene were measured by producing hollow fiber gas separation membranes according to the same method as in Example 2-1 with the exception of changing the composition of the aqueous polyamine solution and post-immersion heating temperatures and times used in Example 2-1 to those respectively shown in Table 2. The results are shown in Table 2.

Example 3-1

The aforementioned support was immersed for 4 hours in a 30% by weight aqueous solution of glycerin (liquid temperature: 25° C.) as a viscous aqueous solution. Next, after immersing in the viscous aqueous solution, the support was immersed in an aqueous polyamine solution (liquid temperature: 25° C.), containing 1% by weight of the isobutyl-modified chitosan produced in the aforementioned Example 1-1 as polyamine, 0.02% by weight of S-242 (trade name, AGC Seimi Chemical Co., Ltd., fluorine-based surfactant having a perfluoroalkyl group) as surfactant, and 1% by weight of acetic acid as other component, at the rate of 1 cm/sec followed by submerging the entire support in the aforementioned aqueous solution and allowing to stand undisturbed therein for 5 seconds. Subsequently, the support was lifted out at the rate of 1 cm/sec followed by drying for 10 minutes at 120° C. to produce a hollow fiber gas separation membrane. After immersing the resulting hollow fiber gas separation membrane for 3 days in 0.8 M aqueous sodium hydroxide solution (solvent: mixture of ethanol and water (volume ratio: 80:20)), the membrane was washed 5 times with distilled water. Subsequently, the membrane was immersed for 24 hours in 7 M aqueous silver nitrate solution to obtain a hollow fiber gas separation membrane containing silver salt. The weights of the polyamine layer before and after containing this silver salt were measured before and after immersion in the aqueous silver nitrate solution with an electronic balance, and when those weights were compared, the concentration of silver salt (silver nitrate) contained in the polyamine layer was determined to be 65% by weight.

The permeation rates of propane and propylene were measured according to the same method as in the aforementioned Example 2-1 using this hollow fiber gas separation membrane containing silver salt. The measurement results are shown in Table 2.

Examples 3-2 and 3-3

The permeation rates of propane and propylene were measured by producing hollow fiber gas separation membranes according to the same method as in Example 3-1 with the exception of changing the type of viscous aqueous solution, composition of the aqueous polyamine solution and heating temperatures and times following immersion in the aqueous polyamine solution used in the aforementioned Example 3-1 to those respectively shown in Table 2. The measurement results are shown in Table 2.

Example 4-1

The aforementioned support was immersed in a crosslinking agent aqueous solution (liquid temperature: 25° C.) containing 1% by weight of glutaraldehyde as crosslinking agent and 0.1% by weight of Tween 20 (trade name, Tokyo Chemical Industry Co., Ltd., polyoxyethylene sorbitan monolaurate) as surfactant at the rate of 1 cm/sec followed by submerging the entire support in the aforementioned aqueous solution and allowing to stand undisturbed therein for 15 minutes. Subsequently, the support was lifted out at the rate of 1 cm/sec. Next, the support was immersed in an aqueous polyamine solution (liquid temperature: 25° C.) containing 1% by weight of chitosan (number-average molecular weight: 100,000) as polyamine and 0.1% by weight of Tween 20 (trade name, Tokyo Chemical Industry Co., Ltd., polyoxyethylene sorbitan monolaurate) as surfactant at the rate of 1 cm/sec followed by submerging the entire support in the aforementioned aqueous solution and allowing to stand undisturbed therein for 15 minutes. Subsequently, the support was lifted out at the rate of 1 cm/sec followed by heating for 7.5 minutes at 120° C. to produce a hollow fiber gas separation membrane. After immersing the resulting hollow fiber gas separation membrane for 3 days in 0.8 M aqueous sodium hydroxide solution (solvent: mixture of ethanol and water (volume ratio: 80:20), the membrane was washed 5 times with distilled water. Subsequently, the membrane was immersed for 24 hours in 7 M aqueous silver nitrate solution to obtain a hollow fiber gas separation membrane containing silver salt. The weights of the polyamine layer before and after containing this silver salt were measured before and after immersion in the aqueous silver nitrate solution with an electronic balance, and when those weights were compared, the concentration of silver salt (silver nitrate) contained in the polyamine layer was determined to be 67% by weight.

The permeation rates of propane and propylene were measured according to the same method as in the aforementioned Example 2-1 using this hollow fiber gas separation membrane containing silver salt. The measurement results are shown in Table 2.

Examples 4-2 to 4-7

The permeation rates of propane and propylene were measured by producing hollow fiber gas separation membranes according to the same method as in Example 4-1 with the exception of changing the type of viscous aqueous solution, composition of the aqueous polyamine solution and heating temperatures and times following immersion in the aqueous polyamine solution used in the aforementioned Example 4-1 to those respectively shown in Table 2. The measurement results are shown in Table 2.

TABLE 2-2

| | Heating Step | | Gas Separation Performance | | |
|---|---|---|---|---|---|
| | Heating temperature after immersion | Heating time | Permeation Rate (GPU) | | |
| | | | Propylene | Propane | Selectivity |
| Example 2-1 | 120° C. | 10 min | 227 | 1.29 | 176 |
| Example 2-2 | 120° C. | 10 min | 368 | 2.99 | 123 |
| Example 2-3 | 120° C. | 10 min | 209 | 1.56 | 134 |
| Example 2-4 | 140° C. | 10 min | 314 | 1.53 | 205 |
| Example 2-5 | 140° C. | 10 min | 276 | 0.965 | 286 |
| Example 2-6 | 140° C. | 10 min | 274 | 1.08 | 254 |
| Example 2-7 | 120° C. | 10 min | 211 | 0.995 | 212 |
| Example 2-8 | 120° C. | 10 min | 288 | 0.996 | 289 |
| Example 2-9 | 120° C. | 10 min | 293 | 0.935 | 313 |
| Example 2-10 | 120° C. | 10 min | 226 | 0.641 | 352 |
| Example 2-11 | 120° C. | 10 min | 275 | 1.17 | 236 |
| Example 2-12 | 120° C. | 10 min | 266 | 0.804 | 331 |
| Example 2-13 | 120° C. | 10 min | 51.2 | 0.155 | 330 |
| Example 2-14 | 120° C. | 10 min | 89.0 | 1.02 | 87.0 |
| Example 2-15 | 120° C. | 10 min | 176 | 1.57 | 112 |
| Example 2-16 | 120° C. | 10 min | 123 | 1.17 | 105 |

TABLE 2-1

| | Pretreatment | | Coating Solution | | | | | |
|---|---|---|---|---|---|---|---|---|
| | | | Polyamine | | Surfactant | | Other Additives | |
| | Immersion Solution | Immersion Conditions | Type | Concentration (wt %) | Type | Concentration (wt %) | Type | Concentration (wt %) |
| Example 2-1 | No pretreatment | — | Example 1-1 | 1 | FC4430 | 0.01 | Acetic acid | 1 |
| Example 2-2 | No pretreatment | — | Example 1-3 | 0.2 | Tween20 | 0.5 | Acetic acid | 0.2 |
| Example 2-3 | No pretreatment | — | Example 1-1 | 0.5 | FC4430 | 0.005 | Acetic acid | 0.5 |
| Example 2-4 | No pretreatment | — | Example 1-8 | 1 | FC4430 | 0.02 | Acetic acid | 1 |
| Example 2-5 | No pretreatment | — | Example 1-7 | 0.5 | S-241 | 0.005 | Acetic acid | 0.5 |
| Example 2-6 | No pretreatment | — | Example 1-6 | 0.5 | FC4430 | 0.01 | Acetic acid | 0.5 |
| Example 2-7 | No pretreatment | — | Example 1-8 | 0.5 | S-242 | 0.01 | Acetic acid | 0.5 |
| Example 2-8 | No pretreatment | — | Example 1-1 | 1 | FC4430 | 0.01 | Acetic acid | 1 |
| Example 2-9 | No pretreatment | — | Example 1-1 | 0.5 | F-444 | 0.05 | Acetic acid | 0.5 |
| | | | | | | | EtOH | 20 |
| Example 2-10 | No pretreatment | — | Example 1-4 | 0.5 | S-242 | 0.02 | Acetic acid | 0.5 |
| Example 2-11 | No pretreatment | — | Example 1-12 | 0.5 | FC4430 | 0.01 | Acetic acid | 0.5 |
| Example 2-12 | No pretreatment | — | Example 1-9 | 0.5 | F-444 | 0.05 | Acetic acid | 0.5 |
| | | | | | | | MeOH | 10 |
| Example 2-13 | No pretreatment | — | Example 1-11 | 0.5 | FC4430 | 0.1 | Acetic acid | 0.5 |
| Example 2-14 | No pretreatment | — | Chitosan | 0.5 | F-444 | 0.01 | Acetic acid | 0.5 |
| Example 2-15 | No pretreatment | — | Example 1-13 | 0.5 | FC4430 | 0.01 | Acetic acid | 0.5 |
| Example 2-16 | No pretreatment | — | Example 1-14 | 0.5 | FC4430 | 0.01 | Acetic acid | 0.5 |

TABLE 2-3

| | Pretreatment | | Coating Solution | | | | | |
|---|---|---|---|---|---|---|---|---|
| | | | Polyamine | | Surfactant | | Other Additives | |
| | Immersion Solution | Immersion Conditions | Type | Concentration (wt %) | Type | Concentration (wt %) | Type | Concentration (wt %) |
| Example 3-1 | Viscous aqueous solution 1 | 25° C. × 4 h | Example 1-10 | 1 | S-242 | 0.02 | Acetic acid | 1 |
| Example 3-2 | Viscous aqueous solution 1 | 25° C. × 4 h | Chitosan | 0.5 | FC4430 | 0.01 | Acetic acid | 0.5 |
| Example 3-3 | Viscous aqueous solution 2 | 25° C. × 4 h | Chitosan | 0.5 | F-477 | 0.05 | Acetic acid | 0.5 |
| Example 4-1 | Crosslinking agent aqueous solution 1 | 25° C. × 15 min | Chitosan | 1 | Tween20 | 0.1 | Acetic acid | 1 |
| Example 4-2 | Crosslinking agent aqueous solution 2 | 25° C. × 15 min | Chitosan | 0.1 | Tween20 | 0.5 | Acetic acid | 0.5 |
| Example 4-3 | Crosslinking agent aqueous solution 3 | 25° C. × 15 min | Chitosan | — | — | — | Acetic acid | — |
| Example 4-4 | Crosslinking agent aqueous solution 4 | 25° C. × 15 min | Chitosan | — | — | — | Acetic acid | — |
| Example 4-5 | Crosslinking agent aqueous solution 5 | 25° C. × 15 min | Chitosan | — | — | — | Acetic acid | — |
| Example 4-6 | Crosslinking agent aqueous solution 6 | 25° C. × 15 min | Chitosan | — | — | — | Acetic acid | — |
| Example 4-7 | Crosslinking agent aqueous solution 7 | 25° C. × 15 min | Chitosan | — | — | — | Acetic acid | — |
| Comp. Ex. 2-1 | No pretreatment | — | Chitosan | 1 | — | — | Acetic acid | 1 |
| Comp. Ex. 2-2 | No pretreatment | — | Example 1-15 | 0.5 | S-242 | 0.05 | Acetic acid | 0.5 |
| Comp. Ex. 2-3 | No pretreatment | — | Example 1-16 | 0.5 | FC4430 | 0.01 | Acetic acid | 0.5 |

TABLE 2-4

| | Heating Step | | Gas Separation Performance | | |
|---|---|---|---|---|---|
| | Heating temperature after immersion | Heating time | Permeation Rate (GPU) | | |
| | | | Propylene | Propane | Selectivity |
| Example 3-1 | 120° C. | 10 min | 433 | 1.60 | 270 |
| Example 3-2 | 140° C. | 7.5 min | 153 | 0.708 | 217 |
| Example 3-3 | 120° C. | 10 min | 49.9 | 0.463 | 108 |
| Example 4-1 | 120° C. | 7.5 min | 101 | 0.821 | 123 |
| Example 4-2 | 120° C. | 7.5 min | 125 | 0.694 | 180 |
| Example 4-3 | 120° C. | 7.5 min | 183 | 0.938 | 195 |
| Example 4-4 | 120° C. | 7.5 min | 153 | 0.718 | 213 |
| Example 4-5 | 120° C. | 7.5 min | 82 | 0.325 | 252 |
| Example 4-6 | 120° C. | 7.5 min | 118 | 0.746 | 158 |
| Example 4-7 | 120° C. | 7.5 min | 142 | 0.802 | 177 |
| Comp. Ex. 2-1 | 120° C. | 10 min | 20.5 | 0.891 | 23.0 |
| Comp. Ex. 2-2 | 123° C. | 13 min | 73.2 | 0.352 | 25.8 |
| Comp. Ex. 2-3 | 124° C. | 14 min | 68.0 | 0.041 | 11.3 |

The compositions of the viscous aqueous solutions and crosslinking agent aqueous solutions indicated in Table 2 are shown in Table 3.

TABLE 3

| | Solute | |
|---|---|---|
| | Type | Concentration (wt %) |
| Viscous aqueous solution 1 | Glycerin | 30 |
| Viscous aqueous solution 2 | Ethylene glycol | 30 |
| Crosslinking agent aqueous solution 1 | Glutaraldehyde Tween20 | 1 0.1 |
| Crosslinking agent aqueous solution 2 | Glutaraldehyde | 3 |
| Crosslinking agent aqueous solution 3 | Glutaraldehyde | 5 |

TABLE 3-continued

| | Solute | |
|---|---|---|
| | Type | Concentration (wt %) |
| Crosslinking agent aqueous solution 4 | Glutaraldehyde | 10 |
| Crosslinking agent aqueous solution 5 | Glutaraldehyde | 20 |
| Crosslinking agent aqueous solution 6 | VS-C | 2 |
| Crosslinking agent aqueous solution 7 | Ethylene glycol Diglycidyl ether | 2.5 |

In Table 2, the number-average molecular weight of the chitosan used as polyamine in Example 3-2 and Examples 4-1 to 4-7 is 100,000. The number-average molecular weight of the chitosan used as polyamine in Example 3-3 and Comparative Example 2-1 is 500,000.

Abbreviations indicated in the columns indicating the type of surfactant in Tables 2 and 3 are respectively defined as indicated below.

[Types of Surfactants]

Tween 20: Trade name, Tokyo Kasei Chemical Co., Ltd., polyoxyethylene sorbitan monolaurate FC-4430: Novec FC-4430, trade name, 3M, fluorine-based surfactant having a perfluoroalkyl group S-241: Trade name, AGC Seimi Chemical Co., Ltd., fluorine-based surfactant having a perfluoroalkyl group S-242: Trade name, AGC Seimi Chemical Co., Ltd., fluorine-based surfactant having a perfluoroalkyl group F-444: Trade name, DIC Corp., fluorine-based surfactant having a perfluoroalkyl group F-477: Trade name, DIC Corp., fluorine-based surfactant having a perfluoroalkyl group Analysis Example 1-1

After completely dissolving the porous support of the hollow fiber gas separation membrane obtained in the aforementioned Example 2-13 with chloroform, the precipitate was recovered followed by vacuum-drying for 24 hours at 50° C. to obtain a polyamine layer. Elemental analysis was carried out on the resulting polyamine layer using the "Model MT-6" elemental analyzer manufactured by Yanaco. The analysis results are shown in Table 4.

The polyamine contained in the polyamine layer of the aforementioned hollow fiber gas separation membrane originates in the chemically modified polyamine obtained in the aforementioned Example 1-11.

Analysis Example 1-2

Elemental analysis was carried out on the hollow fiber gas separation membrane obtained in the aforementioned Example 2-11 according to the same method as in Analysis Example 1-1. The results are shown in Table 4.

The polyamine contained in the polyamine layer of the aforementioned hollow fiber gas separation membrane originates in the chemically modified polyamine obtained in the aforementioned Example 1-12.

Analysis Example 1-3

A hollow fiber gas separation membrane was produced according to the same method as in Example 2-13 with the exception of using an aqueous polyamine solution prepared using 0.5% by weight of the chemically modified chitosan obtained in the aforementioned Example 1-2 as polyamine.

Elemental analysis was carried out on the aforementioned hollow fiber gas separation membrane according to the same method as in Analysis Example 1-1. The results are shown in Table 4.

Analysis Example 1-4

3.37 g of modified chitosan were obtained according to the same method as the aforementioned Example 1-4 with the exception of using 1.19 g of imidazole-4-carboxyaldehyde and 0.895 g of isobutyl aldehyde as modifying agents.

A hollow fiber gas separation membrane was produced according to the same method as Example 2-13 with the exception of using 0.5% by weight of the aforementioned polyamine as polyamine.

Elemental analysis was carried out on the aforementioned hollow fiber gas separation membrane according to the same method as in Analysis Example 1-1. The results are shown in Table 4.

Analysis Example 1-5

A hollow fiber gas separation membrane was produced according to the same method as in Example 2-13 with the exception of using chitosan (number-average molecular weight: 500,000) as polyamine.

Elemental analysis was carried out on the aforementioned hollow fiber gas separation membrane according to the same method as in Analysis Example 1-1. The results are shown in Table 4.

TABLE 4

| | Preparation of Polyamine | | Chemically Modifying Group | | | Elemental Analysis | | | | | |
|---|---|---|---|---|---|---|---|---|---|---|---|
| | Type | Modifying Agent | Eq. | Bonding Mode | Type | Modification Rate (mol %) | C | H | N | O | C/N ratio | C/O ratio |
| Analysis Example 1-1 | Example 1-11 | Isobutyl aldehyde | 1 | Secondary amine | Isobutyl | 31 | 47.9 | 7.80 | 7.30 | 39.2 | 6.6 | 1.2 |
| Analysis Example 1-2 | Example 1-12 | Isobutyl aldehyde | 0.1 | Secondary amine | Isobutyl | 3 | 44.9 | 7.10 | 8.20 | 39.0 | 5.5 | 1.2 |
| Analysis Example 1-3 | Example 1-2 | Imidazole-4-carboxyaldehyde | 1 | Secondary amine | Imidazole | 41 | 47.3 | 6.90 | 12.3 | 33.9 | 3.8 | 1.4 |
| Analysis Example 1-4 | Prepared in Analysis Example 1-4 | Isobutyl aldehyde Imidazole-4-carboxyaldehyde | 0.5 0.5 | Secondary amine | Isobutyl Imidazole | 6.1 4.9 | 44.6 | 6.70 | 9.00 | 38.5 | 5.0 | 1.2 |
| Analysis Example 1-5 | Chitosan | — | — | — | — | — | 44.1 | 7.00 | 8.4 | 41.9 | 5.3 | 1.1 |

Analysis Example 2-1

Relative element concentrations were investigated for the outer surface of the hollow fiber gas separation membrane obtained in Example 3-3 by X-ray photoelectron spectroscopy (XPS). The results are shown in Table 5.

XPS analysis was carried out under the conditions indicated below.
XPS apparatus: Thermo Fisher Scientific Escalab 250
Excitation source: Mono. AlKα, 15 kV×10 mA
Analysis size: Approx. 1 mm oval
Photoelectron take-off angle: 0°
Uptake regions:
Survey scan: 0 to 1, 100 eV
Narrow scan: S2p, C1s, O1s, N1s
Pass energy:
Survey scan: 100 eV
Narrow scan: 20 eV

TABLE 5

| Analysis Example 2-1 Relative Element Concentrations (at %) | |
|---|---|
| S | Not detected |
| C | 66 |
| O | 28 |
| N | 4.7 |
| F | 1.4 |

As shown in Table 5, chitosan-derived N was detected on the surface of the gas separation membrane, while S, which is an indicator of polyether sulfone composing the support, was below the detection limit. On the basis thereof, a polyamine layer composed of chitosan was indicated to be present on the outer surface of the hollow fiber gas separation membrane.

Analysis Example 3-1

Relative element concentrations moving in the direction of depth from the outer surface were investigated for the hollow fiber gas separation membrane obtained in Example 3-3 and the hollow fiber gas separation membrane obtained in Comparative Example 2-1 by argon gas cluster ion beam/X-ray photoelectron spectroscopy (GCIB-XPS). The thicknesses of the polyamine layer and impregnation layer as calculated from these relative element concentrations are shown in Table 6.

A graph indicating the relative element concentrations for the hollow fiber gas separation membrane of Example 3-3 is shown in FIG. 1. "PES" in FIG. 1 is the abbreviation for "polyether sulfone".

GCIB-XPS analysis was carried out under the conditions indicated below.
Apparatus: Ulvac-Phi, Model "Versa Probe II"
(GCIB Conditions)
Accelerating voltage: 15 kV
Cluster size: $Ar_{2500}$
Cluster range: 3 mm×3 mm
Sample rotation during etching: Yes
Etching interval: 3 min/level
Sample current: 23 nA
Total etching time: 69 min
(XPS Conditions)
X-ray: 15 kV, 25 W
Beam size: 100 µm

TABLE 6

| | Layer Thickness (µm) | | |
|---|---|---|---|
| | Polyamine Layer | Impregnation Layer | Total |
| Example 3-3 | 0.5 | 1.3 | 1.8 |
| Comparative Example 2-1 | 5 | 25 | 30 |

Analysis Example 4-1

Figure 2:
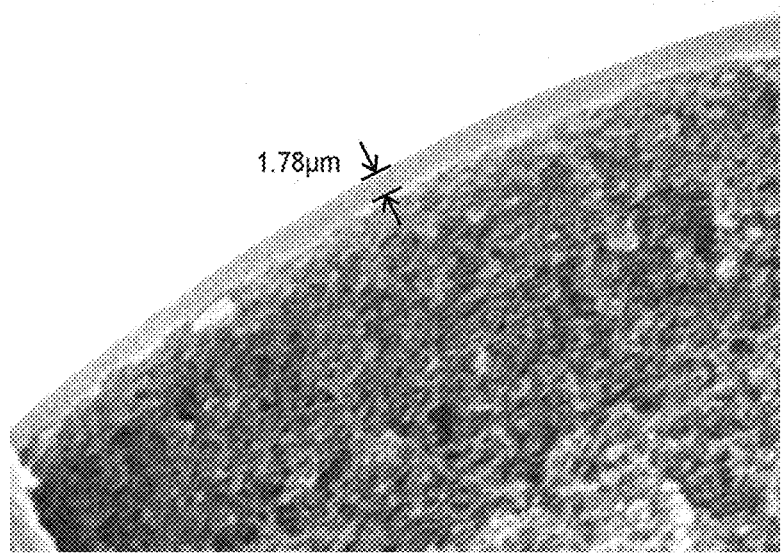
FIG. 2 is a cross-sectional SEM micrograph of a hollow fiber gas separation membrane obtained in Example 3-3.
Figure 3:
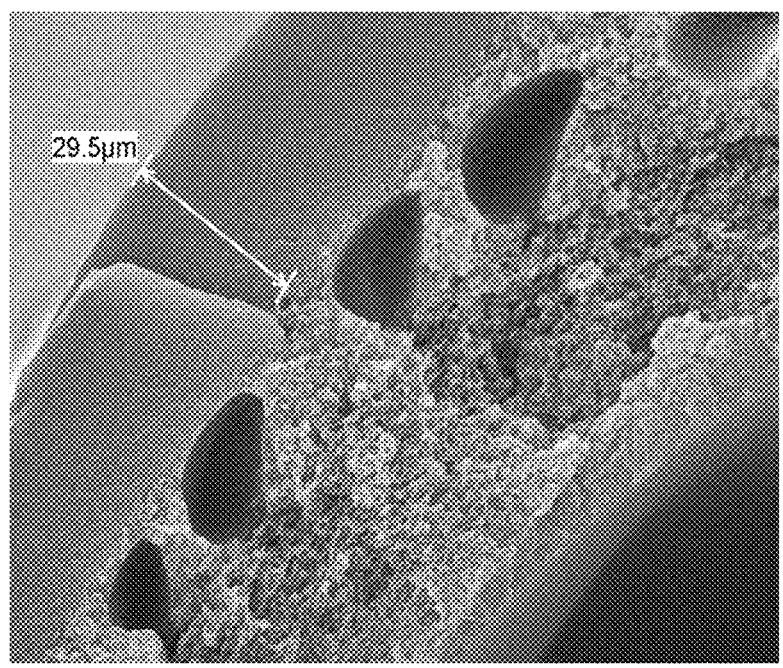
FIG. 3 is a cross-sectional SEM micrograph of a hollow fiber gas separation membrane obtained in Comparative Example 2-1.

Cross-sections of the hollow fiber gas separation membrane obtained in Example 3-3 and the hollow fiber gas separation membrane obtained in Comparative Example 2-1 were observed by scanning electron microscopy (SEM). The results are respectively shown in FIG. 2 (Example 3-3) and FIG. 3 (Comparative Example 2-1).

SEM analysis was carried out under the conditions indicated below.
Apparatus: Model "Carry Scope", JEOL
Accelerating voltage: 20 kV As respectively shown in FIGS. 2 and 3, the total thicknesses of the polysaccharide layer and impregnation layer were about 1.8 µm for the hollow fiber gas separation membrane of Example 3-3 and about 30 µm for the hollow fiber gas separation membrane of Comparative Example 2-1. These results closely coincide with the results of Table 6 in the aforementioned Analysis Example 3-1.

The results for the hollow fiber gas separation membrane of Comparative Example 2-1 indicate that chitosan had penetrated deeply into the interior of the porous support.

Analysis Examples 5-1 to 5-5

The outer surfaces of the hollow tube gas separation membranes respectively obtained in Examples 4-1 to 4-5 were subjected to infrared spectroscopic analysis using infrared spectroscopy coupled with attenuated total reflectance (IR-ATR).

Infrared spectroscopic analysis was carried out under the conditions indicated below.
IR apparatus: Bruker, Model "LUMOS"
Measurement method: ATR (Ge crystals)
Wave number resolution: 4 $cm^{-1}$
Number of integrations: 64
Measured region: 50 µm×50 µm
Analysis depth: Less than 1 µm The functional group ratios calculated by the aforementioned IR-ATR are shown in Table 7 as the ratio of peaks in the vicinity of 3,600 $cm^{-1}$ to 3,000 $cm^{-1}$ attributable to polyamine to imino group peaks attributable to crosslinked structure.

TABLE 7

| | Type of Hollow Fiber Gas Separation Membrane | Functional Group Ratio |
|---|---|---|
| Analysis Example 5-1 | Example 4-1 | 0.925 |
| Analysis Example 5-2 | Example 4-2 | 3.02 |
| Analysis Example 5-3 | Example 4-3 | 4.51 |
| Analysis Example 5-4 | Example 4-4 | 7.32 |
| Analysis Example 5-5 | Example 4-5 | 10.8 |

Figure 4:
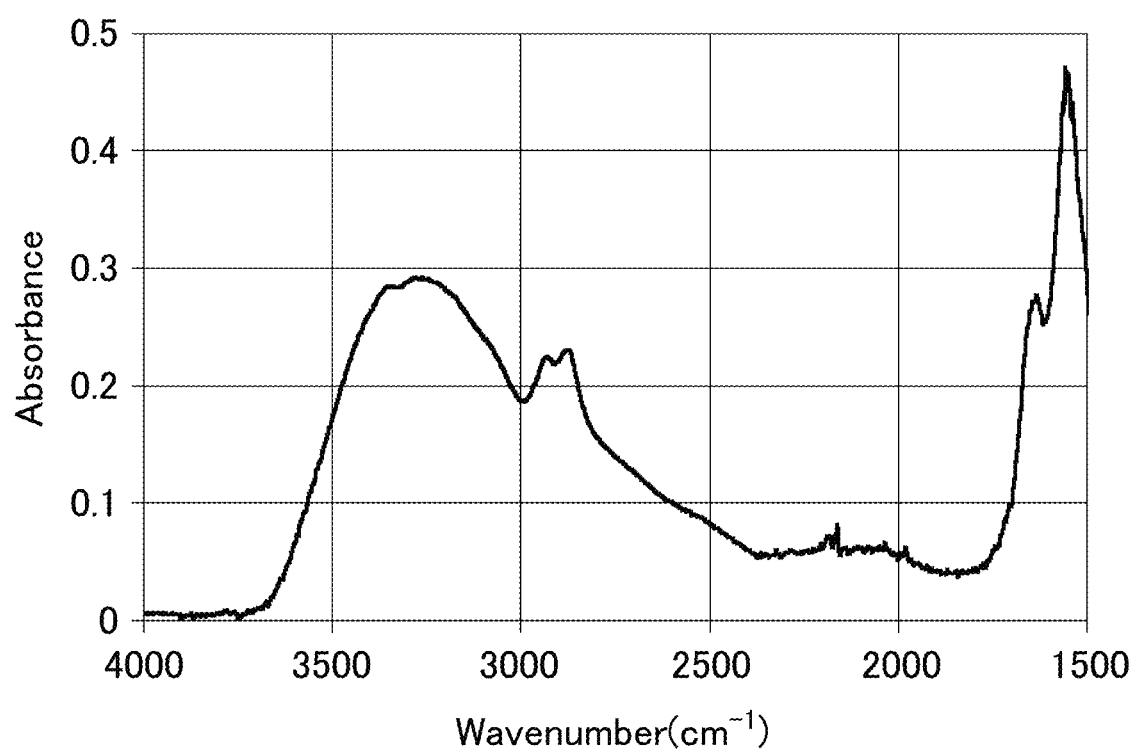
FIG. 4 is an IR-ATR chart obtained for the outer surface of a hollow fiber gas separation membrane obtained in Example 4-1.

The IR-ATR chart obtained for Example 4-1 is shown in FIG. 4.

With reference to FIG. 4, a peak is observed in the vicinity of a wave number of 1,650 $cm^{-1}$ attributable to imino groups representing a crosslinked structure. On the basis thereof, a crosslinked structure was confirmed to be present in the polyamine layer of these gas separation membranes that has imino groups formed by a reaction between amino groups derived from chitosan and aldehyde groups derived from glutaraldehyde.

The aforementioned examples demonstrated that the use of polyamine having a comparatively low molecular weight makes it possible to produce a gas separation membrane having highly practical levels of permeation performance and separation performance. This reason for this is thought to be that reducing the molecular weight of polyamine makes it possible to lower the viscosity of the coating solution, and as a result thereof, reduces the thickness of the resulting polyamine layer.

A gas separation membrane produced according to the production method of the present invention, which comprises a step for immersing a porous support in an aqueous solution containing a polyamine modified with various functional groups, was demonstrated to indicate highly practical levels of permeation performance and separation performance. The reason for this is thought to be that the high cohesive force of polyamine can be weakened by modifying the polyamine with functional groups. Namely, weakening the cohesive force of the polyamine increases the intermolecular chain separation distance of the polyamine in the resulting gas separation membrane, and as a result thereof, the gas separation membrane is thought to demonstrate highly practical gas separation performance.

According to the preferable method for producing a gas separation membrane of the present invention, which uses a coating solution that contains a surfactant in addition to polyamine after going through treatment with a viscous aqueous solution, the polyamine layer was clearly determined to suitably penetrate into the porous support enabling the formation of a thin impregnation layer. As a result, a gas separation membrane demonstrating highly practical permeability performance and separation performance was demonstrated to be able to be produced.

INDUSTRIAL APPLICABILITY

According to an embodiment of the present invention, a gas separation membrane is provided that is capable of carrying out separation of gas such as olefin gas with a high degree of safety and low energy consumption.

The gas separation membrane of the present invention can be preferably used in such fields as polymer production processes or olefin production processes.

The invention claimed is:

1. A gas separation membrane, having a porous support and a polyamine layer formed on the porous support, wherein the number-average molecular weight of the polyamine composing the polyamine layer is 100,000 to 500,000.

2. The gas separation membrane according to claim 1, wherein the polyamine is a gelatinous polymer.

3. The gas separation membrane according to claim 2, wherein the polyamine is chitosan.

4. The gas separation membrane according to claim 1, wherein,
the polyamine layer comprises polyamine,
an impregnation layer obtained by impregnating a polyamine is formed on the side of the polyamine layer of the porous support,
the thickness of the impregnation layer is 20 μm or less, and
the ratio of the thickness of the of the impregnation layer to the thickness of the polyamine layer is 5 or less.

5. The gas separation membrane according to claim 4, wherein
the thickness of the impregnation layer is 5 μm or less, and
the ratio of the thickness of the impregnation layer to the thickness of the polyamine layer is 3 or less.

6. The gas separation membrane according to claim 1, wherein, the polyamine layer has a crosslinked structure.

7. The gas separation membrane according to claim 6, wherein the crosslinked structure contains one or more types of structures selected from the group consisting of a structure having an amide group, a structure having an imide group, a structure having an imino group, a structure having a urea group, a structure having a pyridinium group, a structure having a carbonate group, a structure having a urethane group, a structure having a sulfonyl group, and a structure having an ester group.

8. The gas separation membrane according to claim 7, wherein functional group ratio A/B, defined as the ratio of total absorbance A attributable to functional groups contained in the crosslinked structure to absorbance B attributable to amino groups, during infrared spectroscopic analysis is 0.1 to 7.5.

9. The gas separation membrane according to claim 8, wherein the functional group ratio A/B is 0.9 to 5.0.

10. The gas separation membrane according to claim 1, wherein
the polyamine that composes the polyamine layer is chemically modified with a functional group, and
the modification rate of the polyamine by a functional group is 1% to 80%.

11. The gas separation membrane according to claim 10, wherein the functional group has a protonic acid group having a pKa value of 5 or more.

12. The gas separation membrane according to claim 10, wherein the functional group is at least one group selected from the group consisting of an imidazole group, isobutyl group and glyceryl group.

13. The gas separation membrane according to claim 1, wherein the polyamine that composes the polyamine layer forms a metal salt containing one or more types of metal atoms selected from the group consisting of Ag and Cu.

14. The gas separation membrane according to claim 1, wherein, when using a mixed gas composed of 40% by weight of propane and 60% by weight of propylene, setting the supply side gas flow rate to 190 cc/min, setting the permeation side gas flow rate to 50 cc/min and measuring in a humidified atmosphere under isobaric conditions at 30° C., the permeation rate of propylene gas is 15 GPU to 1,500 GPU and the separation factor α of propylene/propane is 50 to 1,000.

15. A method for producing the gas separation membrane according to claim 1, comprising at least the following steps:
a porous support production step for producing a porous support,
a coating solution production step for producing a coating solution composed of an aqueous solution containing a polyamine, and
a coating step for coating the coating solution on the surface of the porous support,
wherein the method has an impregnation step for impregnating the porous support with a viscous aqueous solution prior to the coating step.

16. The method for producing a gas separation membrane according to claim 15, wherein the viscous aqueous solution is an aqueous solution containing one or more types of solutes selected from glycerin, ethylene glycol and propylene glycol.

17. The method for producing a gas separation membrane according to claim 15, comprising a contact step for contacting the porous support with an aqueous solution containing a crosslinking agent before or after the coating step.

18. The method for producing a gas separation membrane according to claim 15, wherein the polyamine is a chemically modified polyamine.

* * * * *